US008619629B2

(12) United States Patent
Hirano et al.

(10) Patent No.: US 8,619,629 B2
(45) Date of Patent: Dec. 31, 2013

(54) MOBILE TERMINAL AND NETWORK NODE

(75) Inventors: Jun Hirano, Kanagawa (JP); Chun Keong Benjamin Lim, Singapore (SG); Chan Wah Ng, Singapore (SG); Tien Ming Benjamin Koh, Singapore (SG); Mohana Dhamayanthi Jeyatharan, Singapore (SG)

(73) Assignee: Panasonic Corporation, Osaka (JP)

( * ) Notice: Subject to any disclaimer, the term of this patent is extended or adjusted under 35 U.S.C. 154(b) by 226 days.

(21) Appl. No.: 13/003,872

(22) PCT Filed: Jul. 22, 2009

(86) PCT No.: PCT/JP2009/003434
§ 371 (c)(1),
(2), (4) Date: Jan. 12, 2011

(87) PCT Pub. No.: WO2010/010695
PCT Pub. Date: Jan. 28, 2010

(65) Prior Publication Data
US 2011/0116450 A1 May 19, 2011

(30) Foreign Application Priority Data
Jul. 23, 2008 (JP) ................................. 2008-189674

(51) Int. Cl.
*H04L 12/28* (2006.01)
*G06F 15/173* (2006.01)
(52) U.S. Cl.
USPC ......... 370/254; 370/255; 370/395.31; 79/224
(58) Field of Classification Search
USPC ......... 370/216–218, 221, 225, 227, 254, 255, 370/395.31, 395.53; 709/224, 238, 239
See application file for complete search history.

(56) References Cited

U.S. PATENT DOCUMENTS

| 2006/0050628 A1* | 3/2006 | Ng et al. ............. 370/216 |
| 2006/0251044 A1 | 11/2006 | Haddad |
| 2006/0274750 A1 | 12/2006 | Babbar |
| 2007/0147304 A1* | 6/2007 | Jagana et al. ......... 370/331 |

(Continued)

FOREIGN PATENT DOCUMENTS

| WO | 2006/104202 | 10/2006 |
| WO | 2006/111937 | 10/2006 |
| WO | 2006/130807 | 12/2006 |

OTHER PUBLICATIONS

International Search Report dated Oct. 27, 2009.

(Continued)

*Primary Examiner* — Benjamin H Elliott, IV
(74) *Attorney, Agent, or Firm* — Dickinson Wright PLLC

(57) ABSTRACT

Disclosed is a technique for surely supporting multihoming for a mobile terminal (mobile node) moving in a local mobility domain. A mobile node (MN) 11 connects via an IF 110 to a mobile access gateway (MAG) 102 that supports multihoming, and further attempts to connect via an IF 111 to a MAG 103 that does not support multihoming. Under these conditions, according to this technique, when the MN recognizes that the MAG 103 does not support multihoming, the MN notifies a local mobility domain that the MAG 103 does not support multihoming if connection with the MAG 103 is not yet established, and notifies the local mobility domain of information on a connection to a local mobility domain other than the MAG 103 (connection with the MAG 102) if the connection with the MAG 103 is already established.

23 Claims, 6 Drawing Sheets

(56) References Cited

U.S. PATENT DOCUMENTS

| | | | |
|---|---|---|---|
| 2007/0254677 A1 | 11/2007 | Venkitaraman | |
| 2008/0256220 A1* | 10/2008 | Bachmann et al. | 709/222 |
| 2008/0259848 A1* | 10/2008 | Aso et al. | 370/328 |
| 2009/0019180 A1* | 1/2009 | Aso et al. | 709/238 |
| 2009/0047952 A1* | 2/2009 | Giaretta et al. | 455/435.1 |
| 2009/0052316 A1 | 2/2009 | Aso et al. | |
| 2009/0248708 A1* | 10/2009 | Balasubramanian et al. | 707/100 |
| 2010/0315992 A1* | 12/2010 | Turanyi | 370/315 |
| 2011/0007711 A1* | 1/2011 | Muhanna et al. | 370/331 |
| 2011/0116450 A1* | 5/2011 | Hirano et al. | 370/328 |

OTHER PUBLICATIONS

D. Johnson, et al., "Mobility Support in IPv6," IETF RFC 3775, Jun. 2004, pp. 1-165.

S. Gundavelli, et al., "Proxy Mobile IPv6," IETF Internet-Draft, Apr. 2007, pp. 1-46.

S. Gundavelli, et al., "Proxy Mobile IPv6," IETF Internet-Draft, Nov. 2007, pp. 1-72.

R. Wakikawa, et al., "Multiple Care-of Addresses Registration," IETF Internet-Draft, Jun. 2006, pp. 1-36.

M. Jeyatharan, et al., "Multiple Interfaces Mobile Nodes in NetLMM," IETF Internet-Draft, Sep. 2007, pp. 1-12.

* cited by examiner

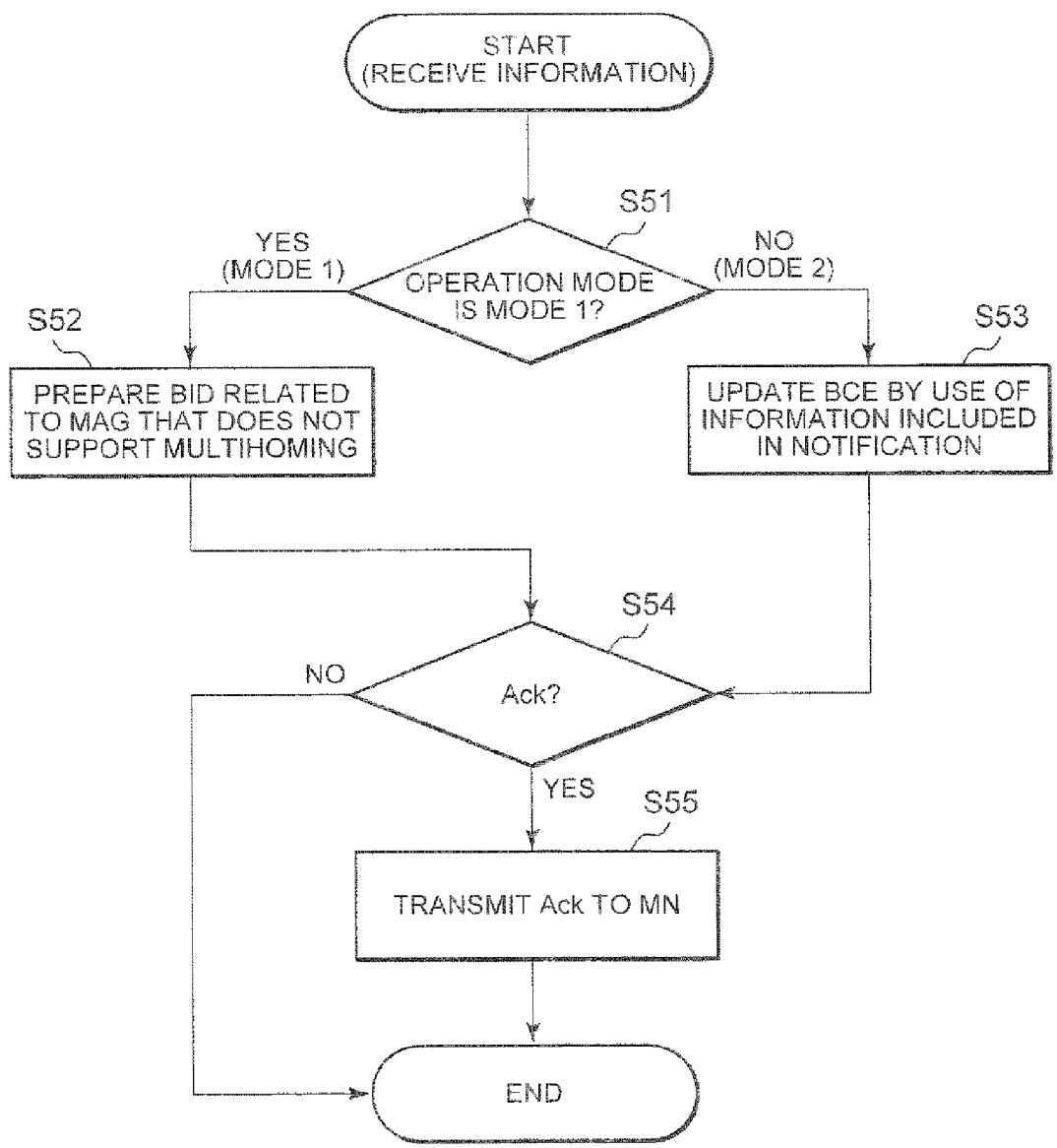

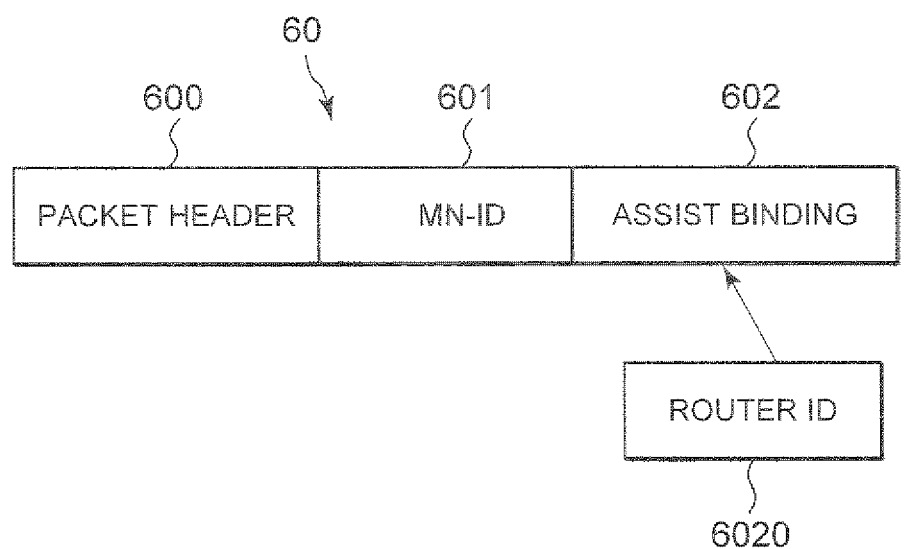

MOBILE TERMINAL AND NETWORK NODE

TECHNICAL FIELD

The present invention relates to a communication technique used in a packet-exchange type data communication network system. The present invention particularly relates to a mobile terminal and a network node which allow a mobile node having a multihoming function to receive a multihoming service when the mobile node is connected to a local mobility domain.

BACKGROUND ART

The mobile IPv6 (MIPv6) described in later-mentioned Non-Patent Document 1 allows a mobile terminal (MN: mobile node) to keep using an interne protocol (IP) address without change before and after changing a connection point to the Internet.

The unchanged IP address in the MIPv6 is an address of the mobile node in a home network domain, and is called a home address. While the mobile node is connected to a foreign network domain, the mobile node can configure an IP address to be used from a subnet prefix notified by the foreign network domain. An IP address configured from the subnet prefix notified by the foreign network domain is called a care-of address, and the mobile node is also reachable over the care-of address.

The mobile node registers the care-of address and the home address at a home agent to create an association with each other so that the mobile node can maintain its reachability regardless of the connection point. In the MIPv6, the home agent is a router within the home network domain of the mobile node, and registers therein a binding of a current care-of address and the home address of the mobile node. This registration is achieved by the mobile node through transmission of a binding update (BU) message to the home agent. If the mobile node is away from the home network domain, the home agent intercepts packets directed to the home address of the mobile node and tunnels the intercepted packets towards the mobile node via the associated care-of address. Based on the above description of the MIPv6, a host (mobile node) performs mobility management in the MIPv6. For this reason, the MIPv6 is also known as a host-based mobility management protocol.

Meanwhile, there is another mobility management scheme which allows a mobile node to move in a local mobility domain without performing mobility-related signaling. In this mobility management scheme, a proxy entity located in the local mobility domain performs mobility management for the mobile node. Such a mobility management scheme is called network-based mobility management, and is described in later-mentioned Non-Patent Document 2, for example.

The mobile node moving in the local mobility domain connects to the proxy entity by presenting mobile node identification information (MN-ID) during the access authentication processing. This proxy entity is a MAG (mobile access gateway) described in Non-Patent Document 2, for example. The MN-ID is associated with a policy profile of the mobile node which can be acquired from a local server. A policy profile includes a characteristic of the network-based mobility service to be provided, and other related parameters (such as a network prefix assigned to the mobile node (MN. Prefix, for example), a permitted address configuration mode, a mobility policy, and other parameters essential for providing the network-based mobility service).

After the access authentication is successful, the mobile access gateway acquires a policy profile of the mobile node from the local server. This means that the mobile access gateway can hold all information necessary for performing mobility signaling related to the mobile node. Accordingly, the mobile access gateway periodically transmits a router notification including a notification of the network prefix (MN. Prefix) of the mobile node. With reference to the MN.Prefix, the mobile node configures an IP address (such as a home address) to perform communication, for an interface connected to the local mobility domain. The connected interface can refer to the MN.Prefix at any time and any place where the mobile node moves in the local mobility domain. This is made possible since each of the mobile access gateways to which the mobile node connects constantly acquires the profile of the mobile node by making a query to the local server. As a result, the mobile node can always use the firstly-configured IP address for communication, regardless of the position at which the mobile node is connected in the local mobility domain.

To achieve this network-based mobility management, an entity called a local mobility anchor (LMA) serves as a logical anchor point for each mobile node in the local mobility domain. Further, the local mobility anchor manages the reachability state of each mobile node. Accordingly, it can be said that the local mobility anchor is similar to the home agent described in Non-Patent Document 1. To function as the anchoring point for each mobile node, the local mobility anchor needs to update a current position of each mobile node. Hence, every time the mobile node connects to the mobile access gateway, the mobile access gateway transmits a proxy binding update (PBU) message to the local mobility anchor. According to this PBU message, a MN.Prefix and a care-of address of the mobile access gateway are associated with each other. This binding allows the local mobility anchor to transmit a packet to the mobile node through an appropriate mobile access gateway.

FIG. 1 shows an example of a system used in network-based mobility management as described above. In FIG. 1, a local mobility domain 10 includes a local mobility anchor (LMA) 101 and multiple mobile access gateways (MAG) 102, 103 and 104. A mobile node (MN) 11 presents its identification information (MN-ID) in the course of access authentication processing, and connects its interface (IF) 110 to the mobile access gateway (MAG) 102.

After the access authentication is successful, the MAG 102 acquires a policy profile of the MN 11 from the local server based on the MN-ID of the MN 11. This means that the MAG 102 can hold all information necessary for performing mobility signaling for the MN 11. Accordingly, the MAG 102 periodically transmits a router notification including a notification of a network prefix (MN. Prefix) of the mobile node. With reference to this MN.Prefix, the MN 11 configures an IP address of the IF 110 to be used in communication. The IF 110 can always refer to the same network Prefix assigned thereto, regardless of wherever the MN 11 moves in the local mobility domain 10. This is made possible since each of the mobile access gateways to which the MN 11 connects constantly retrieves a profile of the MN 11 from the local server. For example, when the MN 11 moves to the MAG 103 and connects to the MAG 103 via the IF 110, the MAG 103 acquires a network prefix, which is assigned to the MN 11, from the local server based on the MN-ID presented during the authentication processing. As a result, the MN 11 can always use the same IP address for communication, regardless of a place where the MN 11 exists in the local mobility domain 10.

As described above, the LMA 101 not only serves as a logical anchor point for each mobile node, but also manages the reachability state of each mobile node. Since the LMA 101 is the anchoring point for each mobile node, the LMA 101 needs to update a current position of each mobile node. Hence, every time the mobile node connects to the mobile access gateway, the mobile access gateway transmits a proxy binding update (PBU) message to the LMA 101. This PBU message enables the LMA 101 to generate a routing entry for the mobile node by use of identification information unique to the mobile node (MN-ID). In this routing entry, the LMA 101 associates a network prefix assigned to the mobile node with a care-of address of the mobile access gateway. This binding allows the LMA 101 to transmit a packet to the mobile node through an appropriate mobile access gateway. The LMA is also a type of router, and generates a binding entry (sometimes simply called binding) by performing a binding registration. When routing a packet, the LMA refers to the routing entry and then transmits a packet. At this time, the LMA may refer to a binding entry as one of routing entries. Note that routing entries are generated by other routing protocols. Thus, a routing entry can be explicitly generated form a binding entry in a similar manner. In this specification, an entry based on a binding registration is described as a binding entry, and an entry referred to upon routing is described as a routing entry. However, as described above, distinction between the two in an actual embodiment depends on implementation appropriately designed by those skilled in the art, and thus the description of this specification may be interpreted with a binding entry and a routing entry interchanged with each other, or may be understood on the assumption that a routing entry is generated from a binding entry.

In FIG. 1, the MN 11 connects with the MAG 102 by use of the IF 110 and performs necessary authentication processing. After being successfully authenticated, the MAG 102 transmits a PBU to the LMA 101. In accordance with the contents of this PBU, the LMA 101 associates, in a binding cache, a home network prefix or a home address of the mobile node with a care-of address of the MAG 102. When the LMA 110 receives a packet directed to the home address of the MN 11, the LMA 110 checks the binding cache to find a routing path for the packet. Here, the LMA 110 specifies that the packet is directed to the MN 11 and tunnels the packet to the MAG 102 in accordance with the entry in the binding cache. The MAG 102 then transfers the packet to the MN 11.

In recent years, in a network-based mobility management scheme, support for simultaneous access from a multi-interface mobile node has been discussed. Here, since multiple network interfaces are installed to portable electronic devices today, introduction of a function for registering multiple care-of addresses in relation to a certain home address has mainly been discussed. Hereinbelow, this technique is referred to as a multihoming function carried out by a mobile node and/or a router. In the course of this discussion, Non-Patent Document 2 was revised and factors that should be taken into account for the local mobility anchor to support multihoming were pointed out. This revised edition is issued as later-mentioned Non-Patent Document 3.

In addition, in later-mentioned Non-Patent Document 4, a method for registering multiple care-of addresses is described. In this method, each of multiple bindings associated to a home address is identified by use of an identification number called a binding unique identification (BID). A BID is assigned to an interface or a care-of address associated to a home address of a mobile node and/or a router. Accordingly, while the home address is associated to the mobile node and/or the router itself, the BID identifies each binding of a simultaneous access registered by the mobile node. The mobile node uses a binding update (BU) message to notify a home agent of the BID, and the home agent records the BID to its binding cache. Moreover, the mobile node and/or the router may set its preference to the home agent to allow selective routing among traffic flows passing through multiple care-of addresses.

Furthermore, in later-mentioned Non-Patent Document 5, an analysis is made on problems that occur in a local mobility domain when a mobile node performs multihoming by use of the technique disclosed in Non-Patent Document 4. Here, focused is a problem in a case where the local mobility domain is unable to support multihoming because a local mobility anchor lacks some function, and integration of Non-Patent Document 3 and Non-Patent Document 4 is considered.

Here, assume a case where a cellular operator introduces both of techniques disclosed in Non-Patent Document 3 and in Non-Patent Document 4 to the system. It is not hard to imagine that the fourth generation (4G) mobile communication technique developed from the third generation partnership project (3GPP) aims to turn the cellular network into an all-IP system. Similarly, the all-IP system is also studied in the third generation partnership project 2 (3GPP2) of the international mobile telecommunications-2000 (IMT-2000) project. In these projects, most cellular operators consider employment of the technique described in Non-Patent Document 3 as a candidate for satisfying a condition that an object of improving promptness and ease of mobile communication is achieved. In addition, since Non-Patent Document 3 refers to support of multihoming in a local mobility domain, it is highly probable that the cellular network will support multihoming in the future. Further, the technique disclosed in Non-Patent Document 3 is advantageous in that means for carrying out load balancing of data can be implemented in such a system, and a cellular operator can support multihoming.

For example, in FIG. 1, assume that both of the interfaces IF 110 and IF 111 of the MN 11 are simultaneously connected to the local mobility domain 10. Here, the IF 110 is connected to the MAG 102, and the IF 111 is connected to the MAG 103. Both of these connections are registered to the LMA 101. Upon receipt of a packet directed to the MN 11, the LMA 101 can refer to the network condition of the local mobility domain 10 to select which of the MAG 102 or the MAG 103 to cause the packet to pass through in transferring the packet to the MN 11. If the MAG 102 is too overloaded to perform packet processing, the LMA 101 can transfer the packet directed to the MN 11 via the MAG 103 instead of transmitting the packet to the MAG 102. Thus, an advantageous point of supporting multihoming in the local mobility domain is that load balancing can be carried out by the local mobility anchor.

In a case where a cellular operator performs settings to support multihoming in a system, some points may need to be considered. One of the points that need to be considered is to keep the local mobility anchor from being overloaded when supporting multihoming. The local mobility anchor serves as a main device for transmission of packets in a local mobility domain, and it is preferable that the local mobility anchor has a relatively simple configuration in a case of simultaneously handling multiple routing paths to a mobile node. Meanwhile, another point that needs to be considered is that a mobile access gateway need not use a complicated function for supporting multihoming. It is preferable that the mobile access gateway is allowed to support a multi-homed mobile node in accordance with the technique described in Non-Patent Document 4, for example.

In a current task of the IETF (Internet engineering task force), multihoming related to network-based mobility management is considered to be an issue that needs to be dealt with in the coming years. This task will be checked when construction of a basic protocol for network-based mobility management is completed. Accordingly, it is highly probable that a cellular operator will firstly provide a basic network-based mobility management scheme and then integrate support of multihoming into the system. As the cellular operator will test this system at the time of integration of the function, at first, it is likely that both of a mobile access gateway that supports a multi-homed mobile node and a mobile access gateway that does not support a multi-homed mobile node will exist in a system. Moreover, in a case where payment of a license fee is required for each mobile access gateway in using the multihoming function, the operator can minimize the maintenance cost by configuring the multihoming function only to some of the mobile access gateways.

Furthermore, in some cases, not all of cellular operators may desire support of multihoming in the system. If it is determined, in accordance with a consumer market of a specific area, that most of the consumers do not use multihoming, the cellular operator may not provide support for multihoming. In such an environment, particularly when there is a roaming agreement among the operators, it is possible that a multi-homed mobile node may simultaneously connect to a mobile access gateway that supports multihoming and a mobile access gateway that does not support multihoming.

PRIOR ART DOCUMENT

Patent Document

Patent Document 1: United States Patent Application Publication No. 20070254677

Non-Patent Document

Non-Patent Document 1: D. Johnson, C. Perkins and J. Arkko, "Mobility Support in IPv6", Internet Engineering Task Force Request For Comments 3775, June 2004.
Non-Patent Document 2: S. Gundavelli, K. Leung, V. Devarapalli, K. Chowdhury and B. Patil, "Proxy Mobile IPv6", Internet Engineering Task Force Internet Draft: draft-ietf-netlmm-proxymip6-00.txt, Apr. 8, 2007.
Non-Patent Document 3: S. Gundavelli, K. Leung, V. Devarapalli, K. Chowdhury and B. Patil, "Proxy Mobile IPv6", Internet Engineering Task Force Internet Draft: draft-ietf-netlmm-proxymip6-07.txt, Nov. 4, 2007.
Non-Patent Document 4: R. Wakikawa, T. Ernst and K. Nagami, "Multiple Care-of Addresses Registration", Internet Engineering Task Force Internet Draft: draft-ietf-monami6-multiplecoa-00.txt, Jun. 12, 2006.
Non-Patent Document 5: M. Jeyatharan, C. Ng and J. Hirano, "Multiple Interfaced Mobile Nodes in NetLMM", Internet Engineering Task Force Internet Draft: draft-jeyatharan-netlmm-multi-interface-ps-00, September, 2007.

As described above, in a case where a multi-homed mobile node simultaneously connects to a mobile access gateway that supports multihoming and a mobile access gateway that does not support multihoming, binding entries related to the multi-homed mobile node may possibly be lost in a local mobility anchor. The reason that the binding entries are lost is, as mentioned in Non-Patent Document 4, a mobility anchor point (such as a home agent) holds multiple binding entries related to the multi-homed mobile node, and when a binding registration that does not include a BID is received, all of the binding entries held therein is deleted and replaced by the newly received binding registration that does not include a BID. Moreover, if the mobility anchor point keeps a single binding entry related to the multi-homed mobile node and receives a binding registration including a BID, the binding entry held therein is replaced by the binding entry of the received binding registration including the BID. As a result, the mobile node loses the multi-homed state, which degrades the service experience for the user of the multi-horned mobile node.

Hereinbelow, this problem will be explained with reference to FIG. 1. In FIG. 1, the local mobility domain 10 includes entities that support multihoming. The LMA 101 is familiar with a method for performing processing on a binding related to a multi-homed mobile node. Similarly, the MAG 102 has a function to support multihoming. In this case, the MAG 102 carries out the technique described in Non-Patent Document 4. Meanwhile, the MAG 103 does not have a function to support multihoming.

When the IF 110 is to be connected to the MAG 102, the MAG 102 transmits a PBU including a BID to the LMA 101 to register the connection. This registration is recorded in the LMA 101 as a binding entry. The MN 11 tries to achieve simultaneous binding in the local mobility domain 10, and attempts to connect to the MAG 103 via the IF 111. With this, the MAG 103 transmits a PBU to the LMA 101 to register this connection. Since the MAG 103 does not have a function to support multihoming, the PBU from the MAG 103 does not include a BID. Upon receipt of this PBU not including a BID, the LMA 101 deletes all bindings related to the MN 11, and replaces them with the single binding entry for the MAG 103. As a result, the MN 11 loses valid paths from the LMA 101 to the MAG 102.

Moreover, when the MAG 102 retransmits a PBU to the LMA 101, the binding entries are similarly replaced, and the LMA 101 deletes the binding entry for the MAG 103 and replaces it with the binding entry for the MAG 102. Such an operation indicates that the MN 11 is unable to carry out multihoming in this system.

Note that a solution for such a problem is described in the above-mentioned Patent Document 1, for example. In the method of Patent Document 1, a mobile node transmits a binding message including an IP address of a proxy node, which is usable in communication with the mobile node, to an anchoring point. Since the mobile node directly notifies the anchoring point of the information on the proxy node in the method of Patent Document 1, the anchoring point is less likely to receive different types of binding registration messages. To be specific, by enabling the mobile node to transmit a notification to the anchoring point, the multihoming function can be maintained by way of the proxy node, regardless of whether or not the proxy node supports multihoming.

SUMMARY OF THE INVENTION

The present invention aims to solve problems in typical multihoming. The invention particularly aims to provide a mobile terminal and a network node which make it possible to maintain support of multihoming for the mobile terminal (mobile node) moving in a local mobility domain.

In order to achieve the above object, a mobile terminal of the present invention is a mobile terminal moving in a local mobility domain in which network-based mobility management is performed and which supports multihoming, the mobile terminal comprising: multiple communication interfaces which enable transmission and reception of packets through multiple paths and which respectively correspond to the multiple paths; and a capability information notification means for, in connecting at least one of the multiple communication interfaces to one of connection nodes functioning as connection points in the local mobility domain, notifying an entity in the local mobility domain of information indicating whether or not the connection node to which one of or all of the multiple communication interfaces are to be connected supports a multihoming function.

With this configuration, the entity in the local mobility domain (local mobility anchor) can maintain support of multihoming for the mobile terminal (mobile node) that moves in the local mobility domain.

Further, in the mobile terminal of the present invention, in addition to the above mobile terminal, in a case where the capability information notification means recognizes that the one of connection nodes to which at least one of the multiple communication interfaces is about to connect does not support multihoming, the capability information notification means transmits a notification to the entity in the local mobility domain.

With this configuration, if the connection node (mobile access gateway) to which the mobile terminal is about to connect is known to not support multihoming, the entity in the local mobility domain can be notified of this information.

Further, in the mobile terminal of the present invention, in addition to the above mobile terminal, in a case where access authentication for connecting to the one of connection nodes to which at least one of the multiple communication interfaces is about to connect is not established, the capability information notification means notifies the entity in the local mobility domain of the information.

With this configuration, the entity in the local mobility domain can be notified that the connection node to which the mobile terminal is about to connect does not support multihoming, before access authentication with the connection node to which the mobile terminal is about to connect is completed.

Further, in addition to the above mobile terminal, the mobile terminal of the present invention includes a capability information reception means for receiving the information on whether or not the connection node supports the multihoming function, from the one of connection nodes to which at least one of the multiple communication interfaces is about to connect.

With this configuration, for example, it is possible to know whether or not the connection node supports multihoming, by referring to capability information on the connection node which is included in a router notification message received from the connection node.

Further, in addition to the above mobile terminal, the mobile terminal of the present invention includes a capability information acquisition means for acquiring, by use of fast mobile IP, the information on whether or not the one of connection nodes to which at least one of the multiple communication interfaces is about to connect supports multihoming.

With this configuration, the mobile terminal can know whether or not the connection node supports multihoming using fast mobile IP.

Further, in addition to the above mobile terminal, the mobile terminal of the present invention includes, upon recognizing that the one of connection nodes to which at least one of the multiple communication interfaces is about to connect does not support multihoming, the capability information notification means notifies the entity in the local mobility domain of information on connections of all communication interfaces connected to the local mobility domain.

With this configuration, the mobile terminal can notify the entity in the local mobility domain of information on connections of all of the communication interfaces connected to the local, mobility domain, except for the communication interface which is about to connect to the connection node.

Further, in addition to the above mobile terminal, the mobile terminal of the present invention includes, in a case where access authentication for connecting to the one of connection nodes to which at least one of the multiple communication interfaces is about to connect is established, the capability information notification means notifies the entity in the local mobility domain of the information.

With this configuration, the entity in the local mobility domain can be notified of connection information on all communication interfaces which may possibly have been deleted, after access authentication with the connection node to which the mobile terminal is about to connect is completed.

Further, in addition to the above mobile terminal, the mobile terminal of the present invention includes an acknowledgment requesting means for requesting an acknowledgment message including a processing result for the information indicating whether or not the connection node to which one of or all of the multiple communication interfaces are connected supports multihoming.

With this configuration, the mobile terminal can know whether or not normal processing has been performed in the entity in the local mobility domain.

Further, in addition to the above mobile terminal, the mobile terminal of the present invention includes a routing reconstruction requesting means for, in a case where the acknowledgment message fails to be received, requesting the entity in the local mobility domain to reconstruct routing information on a connection of the mobile terminal.

With this configuration, the mobile terminal can request for reconstruction of routing information on a connection of the mobile terminal when it is determined that normal processing has not been preformed in the entity of the local mobility domain.

Further, in addition to the above mobile terminal, the mobile terminal of the present invention includes a re-configuration means for, when receiving from the entity in the local mobility domain a notification that a multi-homed state of the mobile terminal is lost, notifying the entity in the local mobility domain of information for re-configuring the multi-homed state of the mobile terminal.

With this configuration, the mobile terminal can construct a desired multi-homed state.

Further, in addition to the above mobile terminal, the mobile terminal of the present invention includes a recovery requesting means for, when it is judged that a routing entry is deleted in the entity in the local mobility domain, requesting recovery of the routing entry that is judged to be deleted.

With this configuration, the mobile terminal can promptly register (recover) the routing entry that is desired to be registered in the entity of the local mobility domain, by requesting for recovery of the routing entry.

Further, in addition to the above mobile terminal, in the mobile terminal of the present invention, the recovery requesting means requests the connection node, which supports multihoming and to which the mobile terminal is connected, to retransmit a registration message for reconstructing the routing entry.

With this configuration, the mobile terminal can promptly register (recover) the routing entry that is desired to be registered in the entity of the local mobility domain, by causing a registration message to be retransmitted to the connection node that supports multihoming.

Further, in addition to the above mobile terminal, in the mobile terminal of the present invention, the recovery requesting means selects the connection node to be requested to retransmit the registration message from among the connection nodes to which the mobile terminal is connected.

With this configuration, the mobile terminal can promptly register (recover) the routing entry that is desired to be registered in the entity of the local mobility domain, by selecting a desired connection node (such as a connection node that is known to support multihoming).

Further, in addition to the above mobile terminal, the mobile terminal of the present invention includes an information collecting and storing means for collecting information indicating whether or not each of the connection nodes in the local mobility domain supports the multihoming function and storing the information as list information.

With this configuration, the search procedure can be made more efficient by using the list information.

Further, in addition to the above mobile terminal, the mobile terminal of the present invention includes a binding specification information notification means for, in a case where the capability information notification means recognizes that the one of connection nodes to which at least one of the multiple communication interfaces is about to connect does not support multihoming, transmitting a notification which includes information indicating a binding to be replaced upon establishment of the connection about to be made to the connection node.

With this configuration, binding information to be updated can be correctly specified in the entity in the local mobility domain.

Further, in addition to the above mobile terminal, in the mobile terminal of the present invention, the information indicating the binding to be replaced upon establishment of the connection about to be made to the connection node includes unique identification information identifying a communication interface related to the binding to be replaced.

With this configuration, the binding information to be updated can be correctly specified in accordance with the identification information on the interface of the mobile terminal in the entity in the local mobility domain.

In addition, to achieve the above object, a network node of the present invention is a network node in a local mobility domain in which network-based mobility management is performed and which supports multihoming for a mobile terminal connected to the local mobility domain, the network node comprising: a routing cache for, in a case where a communication interface of the mobile terminal connects to one of connection nodes which function as connection points in the local mobility domain, holding a correspondence between the communication interface and the connection node as routing information; a capability information reception means for receiving information indicating whether or not the connection node to which one of or all of multiple interfaces included in the mobile terminal are connected supports a multihoming function; and a routing updating means for updating routing information for the mobile terminal in accordance with the information being received by the capability information reception means and indicating whether or not the connection node supports the multihoming function.

With this configuration, an entity (local mobility anchor) in a local mobility domain can maintain support of multihoming for a mobile terminal (mobile node) moving in the local mobility domain.

Further, in addition to the above network node, the network node of the present invention includes: an identification information preparing means for, in a case where the capability information reception means receives information that the one of connection nodes to which at least one of the multiple communication interfaces is about to connect does not support multihoming from the mobile terminal, preparing unique identification information identifying a correspondence between the connection node and the communication interface about to connect to the connection node; and a routing information management means for, when receiving from the connection node the information indicating the correspondence between the connection node and the communication interface about to connect to the connection node, adding the unique identification information to the routing information indicating the correspondence between the communication interface and the connection node and storing the resultant routing information into the routing cache.

With this configuration, the entity in the local mobility domain can know that the connection node to which the mobile terminal is about to connect does not support multihoming, and prepare for assignment of unique identification information corresponding to the connection to register routing information on the connection.

Further, in addition to the above network node, the network node of the present invention includes a routing cache update means for, in a case where the capability information reception means receives from the mobile terminal information on connections of all communication interfaces connected to the local mobility domain, adding routing information to the routing cache in accordance with the information on connections of all of communication interfaces connected to the local mobility domain, the routing information corresponding to all of the communication interfaces connected to the local mobility domain.

This configuration makes it possible to register as routing information connection information on all of communication interfaces which may possibly have been deleted by the entity in the local mobility domain in response to the connection of the mobile terminal with the connection node that does not support multihoming.

Further, in addition to the above network node, the network node of the present invention includes an acknowledgment transmission means for sending the mobile terminal an acknowledgment message including a processing result for information indicating whether or not the connection node to which one of or all of the multiple communication interfaces are connected supports the multihoming function.

With this configuration, the entity in the local mobility domain can notify the mobile terminal of whether or not the information received from the mobile terminal has undergone normal processing.

Further, in addition to the above network node, the network node of the present invention includes a routing information deletion notification means for deleting the routing information for the mobile terminal from the routing cache, and notifying the mobile terminal that a multi-horned state of the mobile terminal is lost.

With this configuration, the entity in the local mobility domain can cause the mobile terminal to re-configure a desired multi-homed state.

Further, in addition to the above network node, the network node of the present invention includes a routing information deletion means for, in a ease of deleting the routing information for the mobile terminal, invalidating a routing according to the routing information to be deleted while suspending deletion thereof for a certain time period, validating the routing information to be deleted in a case of receiving a recovery request for the routing information to be deleted from the mobile terminal within the certain time period, and completely deleting the routing information to be deleted after lapse of the certain time period in a case of receiving no recovery request for the routing information to be deleted from the mobile terminal within the certain time period.

With this configuration, upon receipt of a recovery request for a routing entry from the mobile terminal, the entity in the local mobility domain can promptly register (recover) the routing entry requested by the mobile terminal.

Further, in addition to the above network node, in the network node of the present invention, in a case where the capability information reception means receives from the mobile terminal information indicating a binding to be replaced upon establishment of connection about to be made between the connection node and at least one of the multiple communication interfaces, the routing update means replaces a binding specified by the information indicating the binding to be replaced with a binding related to the connection node about to be connected.

With this configuration, the entity in the local mobility domain can correctly specify the binding information to be updated.

With the above configuration, the present invention has the effect of remedying problems in typical multihoming. In particular, the invention having the above configuration has the effect of making it possible to maintain support of multihoming for a mobile terminal (mobile node) moving in a local mobility domain.

BRIEF DESCRIPTION OF THE DRAWINGS

FIG. 5 is a flowchart showing an example of processing performed by a local mobility anchor in the preferred embodiment of the present invention.

FIG. 6 is a diagram showing an example of a format of a rebind message in the preferred embodiment of the present invention.

FIG. 7 is a table showing an example of a routing cache which supports a recovery operation in the preferred embodiment of the present invention.

DESCRIPTION OF EMBODIMENTS

Hereinbelow, embodiments of the present invention will be described with reference to the drawings. Note that although in the following description, a specific number, time, structure, name of protocol, other parameters and the like are described in detail in some cases for description of the invention, specific conditions used in this specification are used merely for description of the present invention, and do not limit the present invention. For example, to clarify the present invention, known components and modules are indicated by block diagrams.

In the embodiments of the present invention, a description will be given of a method which enables a multi-homed mobile node to provide information for supporting multihoming in a local mobility domain to a local mobility anchor. To support this method, the mobile node firstly needs to judge the capability of a mobile access gateway to which the mobile node attempts to connect. If it is judged that the mobile access gateway does not support multihoming, using this as a trigger, the mobile node provides, to the local mobility anchor, information on the connection to be made. By using this provided information, the local mobility anchor can maintain support of multihoming for the mobile node even when the mobile access gateway is not provided with a function to support multihoming.

Execution of the judging process allows the mobile node to determine whether or not it is necessary to transmit information to the local mobility anchor to maintain the support of multihoming for the mobile node in the local mobility domain.

In addition, in the present invention, a preferable method for allowing the mobile node to know whether or not the mobile access gateway can execute a function to support multihoming for the mobile node is, for example, a method in which the mobile access gateway notifies the mobile node that the mobile access gateway has the function. As a way to achieve this method, the mobile access gateway may use the beacon transmission method described in Institute of Electrical and Electronics Engineers (IEEE) 802.11. As another way to achieve this method, the mobile access gateway may use the router alert transmission method described in Internet Engineering Task Force (IETF). In addition, in a 3G network, broadcast information in each radio access technique (corresponding to a layer 2 technique) may also be used.

Figure 2:
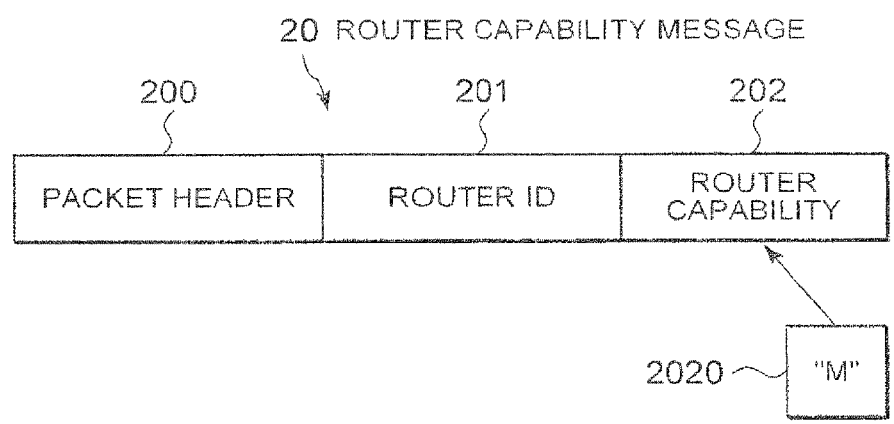
FIG. 2 is a diagram showing an example of a format of a router capability message in a preferred embodiment of the present invention.

FIG. 2 shows an example of a format of a router capability message in a preferred embodiment of the present invention. In FIG. 2, a router capability message 20 includes a packet header 200, a router ID (router identifier) 201, and a router capability field 202.

The packet header 200 is a field for transmitting information on a source (transmitter of the router capability message) or destination of the message. The packet header 200 includes, for example, an IPv4 address or IPv6 address of a source or destination, a type field indicating the message type, a length field indicating the message length and the like.

The router ID 201 is a field for providing router identification information which indicates a capability of the router. Note that it is desirable that the router ID 201 is formed of a MAC address of a mobile access gateway, a unique name of a mobile access gateway set by a service provider of the local mobility domain, or the like.

The router capability field 202 is a field for transmitting a feature (capability information) of a mobile access gateway. Note that in the embodiment of the present invention, the router capability field 202 includes a flag (described here as an "M" flag) 2020 for notifying the mobile node that a mobile access gateway is capable of supporting multihoming (that is, that the mobile access gateway has the function to support multihoming, and is capable of executing the function).

The "M" flag 2020 can be expressed as, for example, a value of a one-bit binary number. For example, the value "1" indicates that a mobile access gateway has the function to support multihoming. In contrast, the value "0" indicates that a mobile access gateway does not have the function to support multihoming (or although having the function to support multihoming, being unable to execute the function).

Note that it is preferable that the default value of the "M" flag 2020 is set to "0," for example. Then, it suffices that only the mobile access gateways capable of supporting multihoming change the value of the "M" flag 2020 to "1." Consequently, it becomes less necessary to change the function of a mobile access gateway that does not have the function to support multihoming, and thus even a legacy node can operate in the system according to the present invention. Note that the values are set under the assumption that a legacy node sets, as an unused area, a part corresponding to the value of the "M" flag 2020 to "0."

Figure 1:
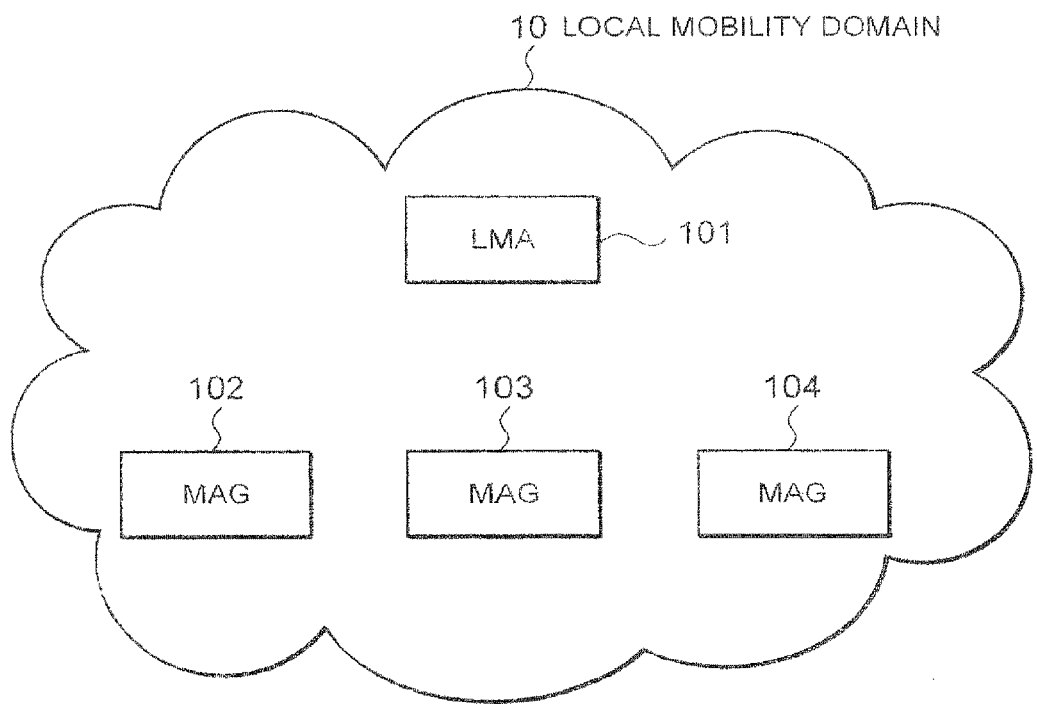
FIG. 1 is a diagram showing an example of a communication system used in network-based mobility management in embodiments of the present invention and in prior art.

Hereinbelow, a description will be given of a simple example of usage of the router capability message 20. In FIG. 1, in the local mobility domain 10, the MAG 102 implements a multihoming protocol. Accordingly, the MAG 102 performs notification by use of the router capability message 20 including the "M" flag 2020 set to the value "1" (value indicating support of multihoming). The MN 11 recognizes that the MAG 102 supports multihoming by receiving this router capability message 20.

Meanwhile, in FIG. 1, it is assumed that the MAG 103 does not implement a multihoming protocol. Accordingly, the MAG 103 performs notification by use of the router capability message 20 including the "M" flag 2020 set to the value "0." The MN 11 recognizes that the MAG 103 does not support multihoming by receiving this router capability message 20.

In addition, another preferable method for allowing the mobile node to know whether or not the mobile access gateway supports multihoming is to use a scheme related to the information service (IS) of IEEE 802.21. In this scheme, the mobile node makes a query relating to the capability of the mobile access gateway to an IS server. The IS server responds to the query from the mobile node.

Hereinbelow, an example of a method of using the information service of the IEEE 802.21 will be described. In FIG. 1, the local mobility domain 10 further includes an IS server (not shown in FIG. 1) storing information on capabilities of all of the mobile access gateways (MAGs 102 to 104) existing in the local mobility domain 10. Before connecting to the MAG 103 via the IF 111, the MN 11 transmits an IS query message to the IS server to check whether the MAG 103 is capable of supporting multihoming for the MN 11. Here, assume that it is judged in the database of the IS server that the MAG 103 does not implement a multihoming protocol. At this time, the IS server sends a response indicating that the MAG 103 is not capable of supporting multihoming to the mobile node.

Figure 3:
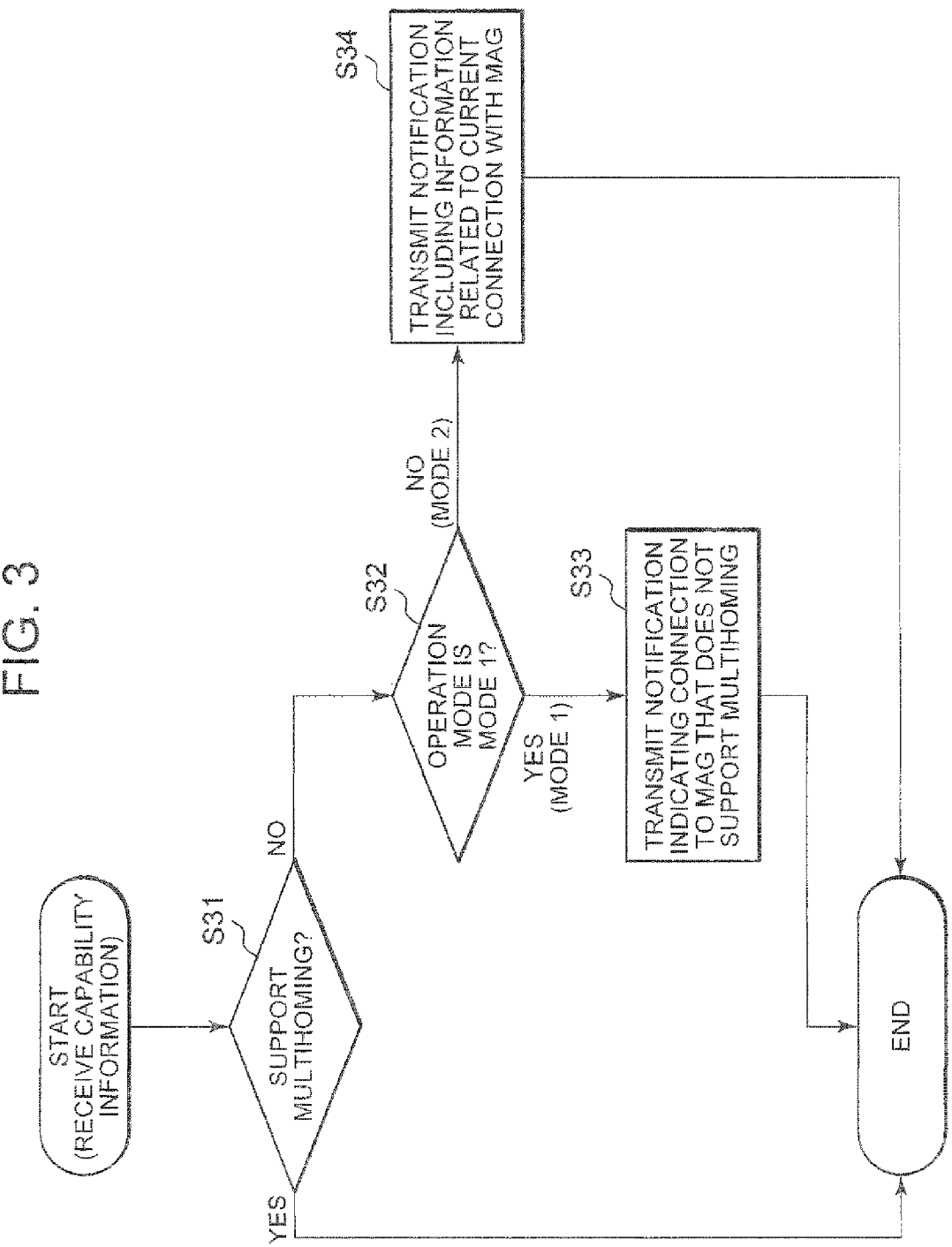
FIG. 3 is a flowchart showing an example of an operation carried out by a mobile node in accordance with received capability information in the preferred embodiment of the present invention.

Upon receipt of the information on the capability of the mobile access gateway (referred to as capability information below), the mobile node analyzes the received capability information, and performs an operation in accordance with the analysis result. FIG. 3 shows a flowchart indicating an example of an operation performed by the mobile node in accordance with the received capability information in the preferred embodiment of the present invention.

In FIG. 3, upon receipt of the capability information on the mobile access gateway, the mobile node determines, by use of the capability information, whether or not the mobile access gateway supports multihoming (step S31). If the mobile access gateway supports multihoming, the processing is terminated. In this case, the mobile node can perform access authority processing with the mobile access gateway without performing any further special processing.

In contrast, if the mobile access gateway does not support multihoming, the mobile node needs to transmit a notification to an entity in the local mobility domain to maintain multihoming in the local mobility domain. This entity may be a local mobility anchor, or may be a mobile access gateway, for example.

In a case where the mobile node transmits a notification to an entity in the local mobility domain to maintain multihoming, any of two modes can be employed as in the following description, for example. Note that the mobile node transmits different types of information in the respective modes (mode 1 and mode 2).

When the operation mode of the mobile node is mode 1 ("mode 1" in step S32), the mobile node notifies an entity in the local mobility domain that the mobile node is about to connect to a mobile access gateway that does not support multihoming (step S33). As a result, upon receipt of this notification, the entity can perform a further step to prevent multihoming for the mobile node from being cut off in the local mobility domain.

This method is particularly advantageous when the mobile node is capable of a priori detecting the capability of the mobile access gateway. This information allows the mobile node to know beforehand that a binding registration message will be transmitted from a mobile access gateway that does not have the multihoming function. Note that as a method of a priori detecting the capability of a mobile access gateway, fast mobile IP constructed by the IETF may be used, for example.

Meanwhile, when the operation mode of the mobile node is mode 2 ("mode 2" in step S32), the mobile node notifies an entity in the local mobility domain of information on the current connection in the local mobility domain (step S34). Upon notification of the information, the entity in the local mobility domain reconstructs a routing cache of the mobile node, and can thereby continue to provide the multihoming service to the mobile node.

This method is particularly advantageous when the mobile node cannot transmit a notification to the entity before the mobile access gateway that does not have the multihoming function transmits a binding registration message. A situation where such a case may occur is, for example, a scenario in which an interface of a mobile node performs a hand-off from one mobile access gateway to another mobile access gateway that does not support multihoming.

In both of the above modes (mode 1 and mode 2), the processing is terminated after the mobile node performs notification to the entity in the local mobility domain. Note that the mobile node may insert information indicating a request for an acknowledgment message (Ack) into the message for performing notification (later-mentioned connection message 40).

Next, the method indicated by the aforementioned flowchart will be described further in detail with reference to FIG. 1. In FIG. 1, assume that the MAG 102 implements a multihoming protocol whereas the MAG 103 does not implement a multihoming protocol. In addition, the MN 11 connects the IF 110 to the MAG 102, and the LMA 101 holds a binding of the MN 11 received through the MAG 102. This binding is identified by identification information unique to the binding (BID1).

At this time, in a case where the MN 11 attempts to connect the IF 111 to the MAG 103 by simultaneous access, the MN 11 acquires information on the MAG 103 related to support of multihoming (capability information on MAG 103).

If the MN 11 acquires the capability information (information indicating that the MAG 103 does not support multihoming) before establishing access authentication with the MAG 103, the MN 11 transmits a message to the LMA 101 to notify that the MN 11 is about to connect to the MAG 103. Note that the message may be transmitted directly from the MN 11 to the LMA 101, or may be forwarded from the MN 11 to a MAG or another arbitrary entity and then reach the LMA 101. Moreover, the message may be transmitted through the MAG 102, or may be piggy-backed on a binding registration message transmitted by the MAG 103.

In contrast, if the MN 11 acquires the information (information indicating that the MAG 103 does not support multihoming) after establishing access authentication with the MAG 103, the MN 11 transmits a similar message to the LMA 101 to further notify the LMA 101 of the connection with the MAG 102. Similarly in this case, the message can be transmitted via the MAG 102 or the MAG 103.

Thus, since the LMA 101 refers to the information notified from the MN 11, the MN 11 can surely continue to receive the multihoming service in the local mobility domain 10.

Hereinbelow, details of a message (referred to as a connection message below) transmitted from the mobile node to an entity in the local mobility domain to maintain multihoming will be described by citing several examples. Note that this connection message may be transmitted from the mobile node through one or multiple mobile access gateways (which may or may not have support for multihoming).

Figure 4:
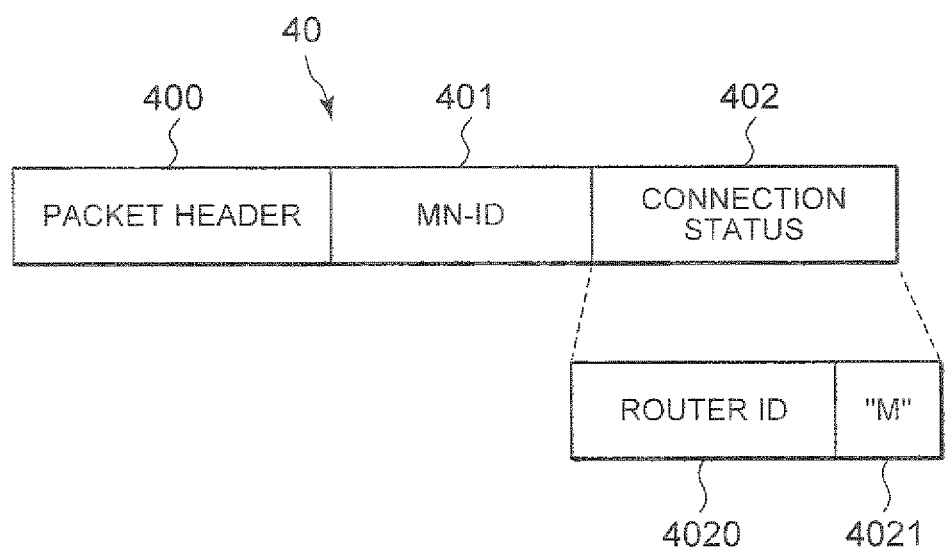
FIG. 4 is a diagram showing an example of a format of a connection message used as a notification for an entity in a local mobility domain in the preferred embodiment of the present invention.

FIG. 4 shows a format of a connection message used to notify an entity in the local mobility domain in the preferred embodiment of the present invention. A connection message 40 includes a packet header 400, mobile node identification information (MN-ID) 401, and a connection status field 402.

The packet header 400 is a field for transmitting information on a source (transmitter of connection message) or destination of the message. The packet header 400 includes, for example, an IPv4 address or IPv6 address of a source or destination, a type field indicating the message type, a length field indicating the message length and the like.

The MN-ID 401 is a field for providing identification information on a mobile node. The identification information allows an entity in the local mobility domain to identify the connection status of the mobile node to which this connection message 40 is applied.

The connection status field 402 is a field for notifying an entity in the local mobility domain of information indicating which mobile access gateway the mobile node is currently connected to (or information indicating which mobile access gateway the mobile node is currently attempting to connect to). Note that the connection status field 402 includes one or multiple router IDs (router identification information) 4020, for example, and it is preferable that this router ID 4020 allows a receiver of the connection message 40 to know which is the target mobile access gateway.

In addition, each router ID 4020 is preferably associated with an "M" flag 4021 which allows a receiver 40 of the connection message to identify whether or not the mobile access gateway specified by the router ID 4020 supports multihoming. The "M" flag 4021 can be expressed as a one-bit value. The "M" flag 4021 set to the value "1" indicates that the mobile access gateway specified by the router ID 4020 supports multihoming. In contrast, the "M" flag 4021 set to the value "0" indicates that the mobile access gateway does not support multihoming.

Hereinbelow, a specific description will be given on how to use the connection message 40 in a preferred embodiment (in the case of mode 1) of the present invention. In FIG. 1, it is assumed that the MAG 102 implements a multihoming protocol whereas the MAG 103 does not implement a multihoming protocol. In addition, the MN 11 connects the IF 110 to the MAG 102, and the LMA 101 holds a routing entry of the MN 11 received through the MAG 102. This routing entry is identified by identification information unique to the binding (BID1). The LMA is also a type of router, and generates a binding entry (sometimes simply called binding) by performing a binding registration. When routing a packet, the LMA refers to the routing entry and then transmits a packet. At this time, the LMA may refer to a binding entry as one of routing entries. Note that routing entries are generated by other routing protocols. Thus, a routing entry can be explicitly generated form a binding entry in a similar manner. In this specification, an entry based on a binding registration is described as a binding entry, and an entry referred to upon routing is described as a routing entry. However, as described above, distinction between the two in an actual embodiment depends on implementation appropriately designed by those skilled in the art, and thus the description of this specification may be interpreted with a binding entry and a routing entry interchanged with each other, or may be understood on the assumption that a routing entry is generated from a binding entry.

At this time, if the MN 11 attempts to connect the IF 111 to the MAG 103 by simultaneous access, the MN 11 acquires information on the MAG 103 related to support of multihoming (capability information on MAG 103).

Here, it is assumed that the MN 11 receives an IEEE 802.11 beacon including the capability information (information indicating that the MAG 103 does not support multihoming) before establishing access authentication with the MAG 103. In this case, the MN 11 determines to notify the LMA 101 of information on the connection to the MAG 103 which the MN 11 is about to carry out, before the MAG 103 transmits a PBU for associating a prefix of the MN and a care-of address of the MAG 103. Then, the MN 11 transmits, to the LMA 101, the connection message 40 including the router ID 4020 indicating the identification information on the MAG 103, and the connection status field 402 having the "M" flag 4021 set to the value "0." As a result, the LMA 101 understands that the MN 11 is about to connect to the MAG 103 that does not support multihoming, and can perform a further step to prevent the multihoming for the MN 11 from being cut off in the local mobility domain.

Further, hereinbelow, a description will be given on how to use the connection message 40 in another embodiment (in the case of mode 2) of the present invention. In FIG. 1, assume that the MAG 102 implements a multihoming protocol whereas the MAG 103 does not implement a multihoming protocol. In addition, the MN 11 connects the IF 110 to the MAG 102, and the LMA 101 holds a routing entry of the MN 11 received through the MAG 102. This routing entry (binding) is identified by identification information unique to the binding (BID1).

In a case where the MN 11 attempts to perform simultaneous access by connecting the IF 111 to the MAG 130, the MN 11 acquires information on the MAG 103 related to support of multihoming. After completion of access authentication with the MAG 103, assume that the MN 11 receives a router notification indicating that the MAG 103 does not have a function to support multihoming. In this case, the MN 11 determines to notify the LMA 101 of information on all connections in the local mobility domain 10. According to this determination, the MN 11 transmits, to the LMA 101, the connection message 40 including the connection status field 402 having the "M" flag 4021 set to the value "1" and the router ID 4020 indicating the identification information on the MAG 102, as well as the "M" flag 4021 set to the value "0" and the router ID 4020 indicating the identification information on the MAG 103. In response, the LMA 101 updates the routing cache of the MN 11, whereby the MN 11 can surely continue to benefit from multihoming in the local mobility domain 10.

Note that in both of the above examples (both examples of mode 1 and mode 2), the connection message 40 transmitted from the mobile node is relayed by the mobile access gateway to the local mobility anchor. With this configuration, the mobile node no longer needs to search for an IP address of the local mobility anchor, and thus the limited battery life of the mobile node can be elongated.

Moreover, the mobile node is capable of selecting whether or not to transmit the connection message 40 through the current connection with the mobile access gateway or through the connection with the mobile access gateway to which the mobile node is about to connect. Since each mobile access gateway transfers a packet received from the mobile node to the local mobility anchor, the local mobility anchor is capable of receiving the connection message 40 by using one of the current connection with the mobile access gateway and the connection with the mobile access gateway to which the mobile node is about to connect.

If the connection message 40 is transmitted through the connection with the mobile access gateway to which the mobile node is about to connect, it is advantageous in that the connection message 40 reaches the local mobility anchor with minimum delay. Note that if the mobile access gateway to which the mobile node is about to connect does not support multihoming, a PBU transmitted from this mobile access gateway may possibly reach the local mobility anchor before the mobile node obtains the capability of the mobile access gateway. As a result, information on all active connections of the mobile node may be deleted from the local mobility anchor. Accordingly, since the local mobility anchor does not expect to receive data related to the mobile node from the mobile access gateway, a packet related to the mobile node received from the mobile access gateway may possibly be deleted in the local mobility anchor.

In addition, if the mobile node cuts off an active connection with the local mobility anchor, the local mobility anchor may possibly transmit a binding cancellation message to the corresponding mobile access gateway. This practically instructs the mobile access gateway to not proxy data of the mobile node to the local mobility anchor, and thus the connection message 40 transmitted from the mobile node to the mobile access gateway could be deleted. In such a case, too, the situation may be improved by preferentially selecting, as the point through which to transmit the connection message, a local mobility anchor that supports multihoming or a local mobility anchor with which a connection is currently maintained.

Note that those skilled in the art should understand from the above description that the method which enables a mobile node to maintain a multihoming operation (the method according to the present invention) is different from the method described in Patent Document 1. In the prior art disclosed in Patent Document 1, a mobile node is triggered to transmit a message indicating an IP address of a proxy node to an anchoring point. With this, the anchoring point is able to maintain the connection with the mobile node.

Similarly, methods for updating an anchoring point by use of a trigger are also disclosed in Non-Patent Document 1 and Non-Patent Document 4. In both of these techniques in Non-Patent Document 1 and Non-Patent Document 4, a mobile node is triggered to update an anchoring point every time an IP address is changed. In addition, in Non-Patent Document 4, identification information which enables identification of each IP address used by the mobile node is included in a message transmitted to the anchoring point.

Both of the above prior art and the present invention have the same concept in that a mobile node is caused to carry out an operation to update an anchoring point by use of information on a new connection point. However, in the present invention, the message to the anchoring point further includes information on the capability of the proxy node. The anchoring point can maintain the connection with the mobile node by using this information. Additionally, the present invention allows the information to be transmitted through a more appropriate proxy node, whereby efficiency of notifying information and stability can be improved. As described, the present invention largely differs from the prior art.

Hereinabove, a description has been given for a method of the present invention, in which a multihoming function is maintained in the local mobility domain by triggering the mobile node to transmit information on the capability of the mobile access gateway to the local mobility anchor. When the information on the capability of the mobile access gateway reaches the local mobility anchor, the information needs to be subjected to processing for determination of the next operation to be carried out by the local mobility anchor.

Hereinbelow, with reference to the flowchart shown in FIG. 5, a description will be given of an example of processing performed by the local mobility anchor in the embodiment of the present invention. The processing in FIG. 5 is initiated when the local mobility anchor receives the connection message 40. When the processing is initiated, the local mobility anchor firstly judges the type of information (the operation mode of the mobile node) included in the connection message 40 (step S51).

For example, if the information indicates that the mobile access gateway does not support a multihoming function (a case where, in aforementioned step S33 of FIG. 3, the operation mode of the mobile node is mode 1 which is a notification that the mobile node is about to connect to a mobile access gateway that does not support multihoming), the local mobility anchor focuses on the connection that is about to be established with the mobile node, and prepares a unique binding identifier (BID) for registration of the connection (step S52).

Meanwhile, if the information is information on all mobile access gateways to which the mobile node is connected (a case where, in aforementioned step S34 of FIG. 3, the operation mode of the mobile mode is mode 2 which is a notification including information on the current connection with the MAG), the local mobility anchor uses the information included in the notification to update a binding cache entry (BCE) that defines routing of the mobile node (step S53).

After information processing is performed in step S52 or step S53, the local mobility anchor checks whether or not an acknowledgment message (Ack) should be transmitted to the mobile node (step S54). Note that as this request for an acknowledgment message, the mobile node may insert a request for an acknowledgment message into the connection message 40, for example. Moreover, the local mobility anchor may return an acknowledgment message to the mobile node even if the mobile node has not requested for the acknowledgment message. If an acknowledgment message needs to be transmitted (for example, if an acknowledgment message transmission request is inserted into the connection message 40), the local mobility anchor transmits an acknowledgment message to the mobile node (step S55). In contrast, if an acknowledgment message does not need to be transmitted, the processing is terminated without carrying out any further operation.

Hereinbelow, a more detailed description will be given of an example of the above method. In FIG. 1, assume that the MAG 102 implements a multihoming protocol whereas the MAG 103 does not implement a multihoming protocol. Upon receipt of the connection message 40 from the MN 11, the LMA 101 checks the connection status field 402 to judge what type of information is inserted into the message.

Assume that the connection message 40 received by the LMA 101 includes, in its connection status field 402, the "M" flag 4021 set to the value "0" together with the router ID 4020 indicating an identifier of the MAG 103. In this case, the LMA 101 understands that it will later receive a PBU related to the MN 11 from the MAG 103. Accordingly, in relation to this PBU, the LMA 101 prepares a binding identifier (BID) unique to this entry. Upon receipt of the PBU from the MAG 103, the LMA 101 adds an entry including the prepared BID to a routing cache of the MN 11. As a result, the LMA 101 can maintain support of multihoming for the MN 11 in the local mobility domain 10.

Meanwhile, assume that the connection message 40 received by the LMA 101 includes, in its connection status field 402, the "M" flag 4021 set to the value "1" together with the router ID 4020 indicating an identifier of the MAG 102. In this case, the LMA 101 understands that the MN 11 desires to receive support for multihoming in the local mobility domain 10.

Note that before receipt of the connection message 40, the LMA 101 may have already received a PBU from the MAG 103, and all entries related to the MN 11 in the routing cache except for the routing entry for the MAG 103 may have been deleted because of the PBU. However, by referring to the information in the connection message 40, the LMA 101 can modify the routing cache related to the MN 11 so as to include the routing entry for the MAG 102 without deleting the routing entry for the MAG 103.

Moreover, even in a case of receiving a PBU from the MAG 103 after receiving the connection message 40, the LMA 101 can maintain the routing cache related to the MN 11 considering that the mobile node is connected to the mobile access gateway that does not support multihoming. As a method for maintaining the routing cache, for example, the LMA 101 may assign a special BID to an entry related to the MAG 103 when updating the routing cache. Whenever the LMA 101 receives a PBU for updating the connection of the MN 11 to the MAG 103, the LMA 101 gives special consideration to perform processing on the PBU in accordance with the routing cache of the MN 11.

Furthermore, for example, a mobile access gateway implementing a function of a multihoming protocol may carry out the process of assigning a unique BID. This means that the mobile access gateway intercepts a message directed to a local mobility anchor, and adds a unique BID related to the mobile access gateway which is known not to have the function of the multihoming protocol. Carrying out this operation is advantageous in that the present invention is also applicable to a ease where the local mobility anchor is a legacy node (that is, a local mobility anchor that is not capable of assigning a special BID to a routing cache entry). In addition, the operation is also advantageous in that a processing load of assigning a BID to the mobile access gateway can be dispersed to perform load balancing of operations carried out by the local mobility anchor.

Hereinbelow, a more detailed example of this operation will be described. In FIG. 1, assume that the MAG 102 implements a multihoming protocol whereas the MAG 103 does not implement a multihoming protocol. In addition, the MN 11 is connected to the MAG 102 via the IF 110, and further attempts to connect to the MAG 103 via the IF 111.

The MAG 103 instructs the MN 11 to transmit the connection message 40 to the LMA 101 via the MAG 102 to notify that the MN 11 is about to connect to the MAG 103. According to this instruction, the MN 11 transmits the connection message 40 to the LMA 101 via the MAG 102, and the MAG 102 specifies the connection message 40 transmitted from the MN 11 by checking the packet type in the packet header 400, for example. Then, the MAG 102 adds a BID related to the MAG 103 to this connection message 40. Thereafter, the connection message to which the BID is added is transferred from the MAG 102 to the LMA 101, and is subjected to processing in the LMA 101.

Further, in another preferred embodiment, upon receipt of the connection message 40 from a mobile node, a local mobility anchor may transmit an acknowledgment message to the mobile node. Note that transmission of the acknowledgement message may be requested by the mobile node. Otherwise, the acknowledgement message may be transmitted even without a request therefor from the mobile node. Transmission of the acknowledgement message is advantageous in that the mobile node can know that information in the connection message 40 is successfully transmitted to the local mobility anchor. For example, the mobile node having received the acknowledgment message can initiate access authentication processing with a mobile access gateway that does not implement a multihoming protocol.

Hereinbelow, a more detailed example of this operation will be described. In FIG. 1, assume that the MAG 102 implements a multihoming protocol whereas the MAG 103 does not implement a multihoming protocol. In addition, the MN 11 is connected to the MAG 102 via the IF 110, and further attempts to connect to the MAG 103 via the IF 111.

The MAG 103 instructs the MN 11 to transmit the connection message 40 to the LMA 101 via the MAG 102 to notify that the MN 11 is about to connect to the MAG 103. The MN 11 determines not to perform access authentication processing with the MAG 103 until it receives an acknowledgment message from the LMA 101, to thereby prevent inconsistency in the routing cache of the LMA 101. Meanwhile, upon successful receipt of the connection message 40, the LMA 101 returns an acknowledgment message to the MN 11. After receiving the acknowledgment message indicating the success, the MN 11 can instruct the IF 111 to initiate access authentication processing with the MAG 103.

Further, in another preferred embodiment, a mobile node may request a mobile access gateway for retransmission of a registration message to a local mobility anchor, the mobile access gateway having an active connection with the mobile node and supporting multihoming. Note that in this specification, a message used by a mobile node to request a mobile access gateway for retransmission of a registration message to a local mobility anchor is called a rebind message.

Thus, the reason for requesting for retransmission of a registration message to the local mobility anchor is, for example, because if an acknowledgment message from the local mobility anchor is not returned to the mobile node, initiation of access authentication processing between the mobile node and the mobile access gateway will be largely delayed. In this case, the mobile node initiates access authentication processing with a mobile access gateway that does not support multihoming, and then requests a mobile access gateway that supports multihoming for retransmission of the registration message. Such a case occurs when the local mobility anchor receives a registration message from a mobile access gateway that does not support multihoming, while the multihoming function of the mobile node is not supported in the local mobility domain.

When a registration message is retransmitted from a mobile access gateway, this means that the mobile node desires reconstruction of the routing cache of the mobile node in the local mobility anchor. Further, if the mobile node has an active connection with a mobile access gateway that does not support multihoming, the mobile node may transfer the registration of the mobile access gateway to a mobile access gateway that supports multihoming.

FIG. 6 shows an example of a format of a rebind message in the preferred embodiment of the present invention. A rebind message 60 includes a packet header 600, a mobile node identifier (MN-ID) 601, and an assist binding field 602.

The packet header 600 is a field for transmitting information on a source (transmitter of the rebind message) or destination of the message. The packet header 600 includes, for example, an IPv4 address or IPv6 address of a source or destination, a type field indicating the message type, a length field indicating the message length and the like.

The MN-ID 601 is a field that includes an identifier of a mobile node, and this mobile node identifier allows a mobile access gateway to identify which binding of the mobile node needs to be retransmitted to the local mobility anchor.

The assist binding field 602 is a field to allow the mobile node to record additional binding information. Additional binding information indicates that the mobile node seeks support from the mobile access gateway for registration to the local mobility anchor. Note, for example, that the assist binding field 602 desirably includes, one or multiple router identifiers (router ID) 6020, and the router ID 6020 allows the mobile node to specify an additional mobile access gateway to be inserted into a registration message to the local mobility anchor.

Hereinbelow, a usage example of the rebind message 60 will be described in further detail. In FIG. 1, assume that the MAG 102 implements a multihoming protocol whereas the MAG 103 does not implement a multihoming protocol. Since the MN 11 does not want to delay access authentication processing with the MAG 103, the MN 11 causes the IF 111 to initiate the processing. At the same time, the MN 11 transmits, to the MAG 102, the rebind message 60 requesting for retransmission of a PBU to the LMA 101. Note that the MN 11 adds identification information on the MAG 103 to the assist binding field 602, to request the MAG 102 for assignment of a BID related to the MAG 103 when registering to the LMA 101. The MAG 102 transmits, to the LMA 101, the PBU including a binding of the MAG 103 in addition to a binding of the MAG 102 itself. With this, the LMA 101 understands that the MN 11 is connected to the mobile access gateway that does not support multihoming. In addition, the LMA 101 can give consideration to multihoming while maintaining the routing cache related to the MN 11.

In another preferred embodiment, by use of a rebind message, a mobile node can select one of mobile access gateways which support multihoming and which can handle all current registrations in a local mobility domain. In this case, an identifier of the mobile access gateway is inserted into the assist binding field 602, regardless of whether or not the mobile access gateway supports multihoming.

For example, in FIG. 1, it is assumed that the MAG 102 implements a multihoming protocol whereas the MAG 103 does not implement a multihoming protocol. Knowing that the MAG 103 does not support multihoming, the MN 11 transmits, to the MAG 102, the rebind message 60 to request for registration processing for the MAG 103 to the LMA 101. With this, the MAG 102 transmits, in place of the MAG 103, a PBU for registering a routing entry to the LMA 101. A BID assigned by the MAG 102 is further added to this entry. In addition, the MAG 102 is capable of notifying the LMA 101 that the MN 11 is about to connect to the mobile access gateway that does not support multihoming. As a result, the LMA 101 may determine to transfer the registration processing of the MN 11 via the MAG 103 to the MAG 102.

In yet another preferred embodiment, a local mobility anchor may implement a special function to support multihoming for a mobile node in a local mobility domain. For example, when the local mobility anchor detects a registration message from a mobile access gateway that does not virtually support a multihoming function for the mobile node, the local mobility anchor generates a temporary entry related to this new registration, instead of changing the routing cache of the mobile node. At the same time, the local mobility anchor can check with the mobile node when it recognizes that the multihoming function for the mobile node will be lost based on this registration message.

In still yet another preferred embodiment, a local mobility anchor may perform processing to change the routing cache of a mobile node, and thereby cause the mobile node to lose its multihoming function in a local mobility domain. At this time, the local mobility anchor transmits a message notifying that the multihoming function in the local mobility domain is lost to the mobile node. Further, this message may notify the mobile node that the multihoming function of the mobile node is lost because the local mobility anchor has received a registration of the mobile node from a mobile access gateway that does not support multihoming. Transmission of such a message from the local mobility anchor is advantageous in that the mobile node can be notified of the capability of the mobile access gateway to which the mobile node is currently connected. Note that in this case, the mobile node may perform reconstruction (re-registration processing) of the multihoming function in the local mobility domain by use of the method of the present invention, for example.

Further, in still yet another preferred embodiment, a mobile node may check the capability of each mobile access gateway, and thereby create a list of the mobile access gateways in a local mobility domain or collect information on the capability of the respective mobile access gateways in the local mobility domain. This list may, for example, be held for a certain period, or for a certain number of list items. Moreover, this list may be transmitted to a local mobility anchor for notification of the capability of the mobile access gateways in the local mobility domain. This is particularly advantageous for a case where the local mobility anchor and the mobile access gateway not belonging to the same provider are installed in a common local mobility domain. An example is a case where a roaming agreement is made among cellular operators. In this roaming agreement, for example, a mobile access gateway can register a routing path for a mobile node of the other operator to a local mobility anchor of the other operator. Note that such a list may be generated on the local mobility domain side (or on the one or multiple operators' side).

For example, a mobile node may use this list to set, in a local mobility anchor, a preference in using a mobile access gateway that does not support multihoming. For example, an example is a case where a mobile node does not desire to connect to a mobile access gateway that does not support multihoming, and thus requests the local mobility anchor to notify only of mobile access gateways that support multihoming.

In another example, a mobile node may set, in a local mobility anchor, a low preference in use of a mobile access gateway to which the mobile node is about to connect. In this case, the local mobility anchor can support an operation of the mobile node to search for another appropriate mobile access gateway existing near the mobile node.

Further consideration needs to be given to maintain the multihoming function of a mobile node in a case where an interface of the mobile node moves in a local mobility domain. For example, in FIG. 1, assume that each of the MAG 102 and the MAG 103 implements a multihoming protocol, whereas a MAG 104 does not implement a multihoming protocol. In addition, the IF 110 of the MN 11 is connected to the MAG 102, and the IF 111 of the MN 11 is connected to the MAG 103. Under these conditions, assume that the IF 111 of the MN 11 is about to move from the MAG 103 to the MAG 104.

In the preferred embodiment of the present invention, when the MN 11 notifies the LMA 101 that the MN 11 is about to connect to the MAG 104, there occurs a problem that the LMA 101 does not know which of the bindings will be replaced by this connection. Such a problem occurs particularly in a case where, due to network congestion between the MAG 102 and the LMA 101, for example, a de-registration message from the MAG 102 reaches the LMA 101 later than the registration of the connection of the MAG 104. In consideration of such a case, the mobile node needs to add more detailed information for notifying the local mobility anchor of which of the bindings is to be replaced by this connection.

As such information to be added to specify a connection (binding), for example, the local mobility anchor may set, for each of the multiple interfaces of the mobile node, an interface identifier (IF-ID) in a uniquely identifiable form. In the case of this example, in the LMA 101, for example, each routing entry is associated with an IF-ID of the MN 11. For example, a routing entry for the MAG 102 is associated with an IF-ID of the IF 110, and a routing entry for the MAG 103 is associated with the IF-ID of the IF 111. By using the IF-ID of the IF 111, the MN 11 can notify the LMA 101 that the IF 111 is to be used for the connection with the MAG 104. With this, the LMA 101 can understand that the connection to be made with the MAG 104 requires replacement of the routing entry for the MAG 103.

In another preferred embodiment, in a case where a common identifier (BID) is used to identify respective routing entries related to a mobile node regardless of the types of mobile access gateways, the mobile node may possibly lose some active routes to a local mobility anchor due to unexpected deletion of these entries.

For example, in the above scenario, in a case where the LMA 101 receives a notification that the IF 111 is about to move from the MAG 103 to the MAG 104, it is possible that a BID previously assigned to the MAG 103 is used for a routing entry related to the MAG 104. A method of thus reusing a BID is generally employed when a local mobility anchor limits the number of BIDs that need to be held therein. At this time, if transmission of a de-registration message from the MAG 103 to the LMA 101 is delayed due to network congestion, for example, the de-registration message will delete the already-replaced routing entry (routing entry for MAG 104). This is because the de-registration message includes the same BID as that assigned to the MAG 104.

To avoid such a situation, it is necessary that the unique binding identifiers (BID) used for identification of the respective routing entries of the mobile node be distinguished by the types of different mobile access gateways. For example, a mobile access gateway that does not support multihoming in a local mobility domain is distinguished by using BID value of equal to or larger than 128.

In addition, in another embodiment for solving this problem, binding identifiers (BID) may be used in an order of an operation sequence. For example, for every registration message received from a different mobile access gateway, a local mobility anchor increments the BID therefor by one. For example, in a case where BID 41 is used for an entry for the MAG 102 and the LMA 101 receives a registration message related to the MN 11 from the MAG 103, BID 42 is assigned to this entry (entry for MAG 103). Such a counter may be reset to return to the initial value when the mobile node is not operated for a certain time period.

Further, in another preferred embodiment, a mark may be added to a routing entry related to a mobile node, so that the entry is deleted after the elapse of a certain period instead of being deleted instantaneously. When the mark indicating deletion from the routing cache is added, a timer is set for this routing entry. With expiration of the timer, the routing entry is deleted completely from the routing cache.

This recovery operation is advantageous in a case where the mobile node desires recovery of an unexpectedly deleted binding. An example is the case where, in a local mobility anchor, an entry related to the mobile node in the routing cache is deleted by receiving a registration message from a mobile access gateway that does not support a multihoming function. In this case, the mobile node transmits a recovery message to request the local mobility anchor for recovery of all deleted routing entries related to the mobile node (or specific routing entries which need to be recovered to obtain a desired multi-homed state). This recovery message may be implemented as a flag inserted into an arbitrary message transmitted to the local mobility anchor.

FIG. 7 shows an example of a routing cache for supporting a recovery operation in the preferred embodiment of the present invention. Note that a function of the routing cache may be provided inside any entity (mobile node, local mobility anchor and the like) which implements the present invention.

Normally, a routing cache 70 includes a mobile node identifier (MN-ID) field 71, a binding identifier (BID) field 72, a care-of address (CoA) field 73, a path field 74 and an inactivity timer field 75.

The MN-ID field 71 normally includes a prefix assigned to the mobile node used in the local mobility domain. Similarly, the BID field 72 normally includes a unique binding identifier used to distinguish different routing entries of the mobile node. The CoA field 73 is used to identify a care-of address of a mobile access gateway to which the mobile node is connected. A packet can be routed to the mobile node by using the information in routing cache 70.

In the present invention, an entity can refer to the path field 74 to know whether or not a routing is still active in the local mobility domain. If the entry is marked with "invalid" in the path field 74, this means that the routing path cannot be used. In contrast, if the entry is marked with "valid," this means that the routing path can be used. In addition, the inactivity timer field 75 includes information for notifying the entity of remaining time before a routing path is deleted completely from the routing cache. The inactivity timer field 75 is normally set when the path field 74 indicates "invalid."

Hereinbelow, an example of the above-mentioned recovery operation according to the invention will be described. In FIG. 7, upon receipt of a registration message from a mobile access gateway that does not support multihoming (MAG 104), the LMA 101 constructs the routing cache shown in FIG. 7. When the LMA 101 receives this registration message, the LMA 101 marks both entries for the MAG 102 and the MAG 103 as deletion targets. With this, the LMA 101 sets "inactive" for both entries, and sets a timer (such as for 60 minutes) for each of the entries for counting the time until it is deleted completely from the routing cache.

Meanwhile, the MN 11 finds that the IF 110 has lost its connection with the MAG 102, and knows that some problem has occurred in the routing cache in the LMA 101. To reconstruct the routing path between the LMA 101 and the MAG 102, the MN 11 transmits a recovery message requesting for recovery of the inactive binding to the LMA 101. Upon receipt of this recovery message, the LMA 101 adds "active" marks to recover both entries for the MAG 102 and the MAG 103. Note that the LMA 101 can make a query to each of the MAG 102 and the MAG 103 to determine which of the entries is still active, before recovering the entries to the "active" state. Otherwise, the MN 11 may include the entry (entry related to MAG 102 in this case) for which recovery is desired in the recovery message to the LMA 101, so that only this entry may be recovered to the "active" state.

In another embodiment of the present invention, (a part of) information according to the present invention may be transmitted during AAA (authentication, authorization and accounting) processing between a mobile node and an AAA server in a local mobility domain. For example, the mobile node may notify the AAA server that it desires support of multihoming in the local mobility domain. This request from the mobile node is forwarded from the AAA server to a local mobility cache that handles the routing cache of the mobile node. With this, upon receipt of a registration message that may delete a multihoming function of the mobile node, the local mobility anchor can perform further operation to prevent the multihoming function from being cut off. Note that such an operation by the local mobility anchor is preferably carried out according to the method of the present invention.

Moreover, the mobile node may request for a list of mobile access gateways and capabilities thereof during the AAA processing. Thus, the mobile node can search for a connectable mobile access gateway that supports multihoming. For example, if an interface of the mobile node finds a mobile access gateway that does not support multihoming, the mobile node instructs the interface not to connect with the mobile access gateway in order to maintain the multihoming function in the local mobility domain.

Figure 8:
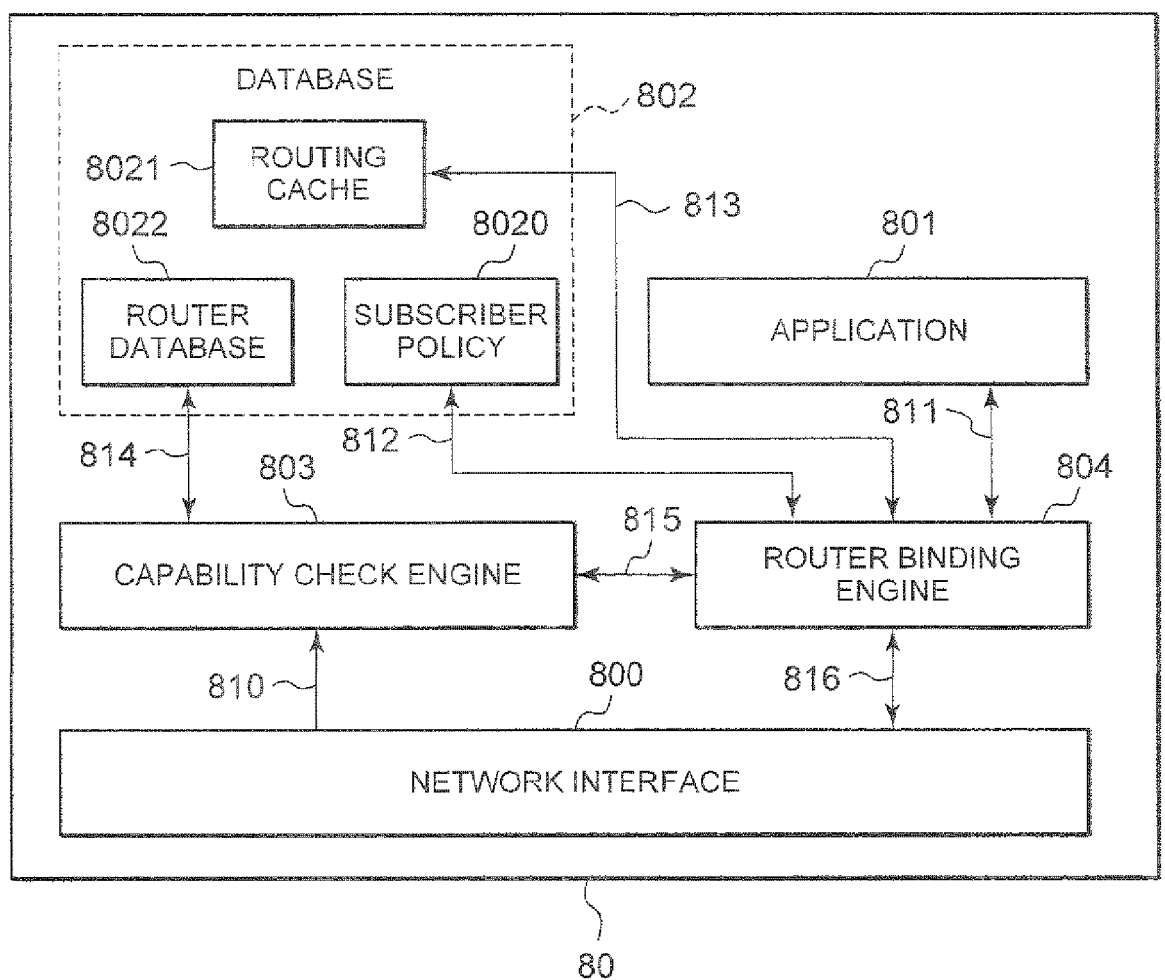
FIG. 8 is a block diagram showing an example of a functional architecture of the mobile node in the preferred embodiment of the present invention.

Next, a description will be given of an apparatus by which the present invention can be implemented. FIG. 8 is a block diagram showing an example of a functional architecture of the mobile node in the preferred embodiment of the present invention. In FIG. 8, a functional architecture 80 of the mobile node is configured of a network interface 800, an application 801, a database 802, a capability check engine 803 and a router binding engine 804.

The network interface 800 is a functional block including the entire hardware and software necessary for communicating with another node through an arbitrary communication medium. In related known technical terms, the network interface 800 refers to communication components in Layer 1 (physical layer) and Layer 2 (data link layer), firmware, a driver, a communication protocol and the like. Note that although FIG. 8 only shows one network interface 800, the mobile node may include one or multiple network interfaces 800.

Through a signal/data path 810, the network interface 800 and the capability check engine 803 can communicate with each other, and a trigger and/or a packet can be transmitted. For example, the router capability message 20 received in the network interface 800 is transferred to the capability check engine 803 through the signal/data path 810, whereby the capability check engine 803 can specify the capability of a specific mobile access gateway.

Through a signal/data path 816, the network interface 800 and the router binding engine 804 can communicate with each other, and a trigger and/or a packet can be transmitted. For example, the connection message 40 is transferred from the router binding engine 804 to the network interface 800, and can then be transmitted from the network interface 800 to an entity in the local mobility domain.

The application 801 indicates a functional block including protocols and programs positioned higher than the network layer in the communication protocol stack. The application 801 includes, for example, an arbitrary transport layer protocol or a session layer such as a transport session protocol (TCP: transmission control protocol), a stream control transport protocol (SCTP), a user datagram protocol (UDP), programs and software necessary for communication with another node and the like. Note that although FIG. 8 only shows one application 801, the mobile node may include one or multiple applications 801.

Through a signal/data path 811, the application 801 and the router binding engine 804 can communicate with each other, and a trigger and/or a packet can be transmitted. For example, the application 801 triggers the router binding engine 804 through the signal/data path 811 to request for capability information of a specific mobile access gateway existing near the network interface 800.

The database 802 is capable of storing information necessary for the mobile node. Note that the database 802 may be configured of a subscriber policy 8020, a routing cache 8021 and a router database 8022, for example.

The subscriber policy 8020 usually includes information on a subscriber of a specific service. For example, as information on a subscriber of a specific service, a mobile node identifier (MN-ID) used for identification of a mobile node while being connected to a local mobility domain may be used. When generating the connection message 40, the router binding engine 804 can refer to the MN-ID in the subscriber policy 8020 through a signal/data path 812.

The routing cache 8021 includes entries related to active connections with mobile access gateways which the mobile node maintains in the local mobility domain. When generating the connection message 40 for reestablishing the multihoming function of the mobile node in the local mobility domain, the router binding engine 804 searches for all of pieces of information on connections stored in the routing cache 8021 through a signal/data path 813.

The router database 8022 includes information on mobile access gateways in the local mobility domain. For example, a list of all of mobile access gateways existing in the local mobility domain and corresponding capabilities thereof is stored in the router database 8022. The capability check engine 803 may update the router database 8022 by use of information on all of the mobile access gateways existing in the local mobility domain and corresponding capabilities thereof through a signal/data path 814.

In the embodiment of the present invention, the capability check engine 803 may operate as a capability information receiver for receiving capability information included in the router capability message 20, and determine whether or not a mobile access gateway supports multihoming by referring to the router capability message 20. The capability information of the mobile access gateway determined from the router capability message 20 is stored to the router database 8022. Note that the capability check engine 803 may acquire capability information on a local mobility anchor to which the mobile node is about to connect by use of an arbitrary method (such as fast mobile IP).

The capability check engine 803 may trigger an appropriate operation to be performed by the router binding engine 804 through a signal/data path 815 in accordance with the capability information of the mobile access gateway. For example, if the mobile access gateway supports multihoming, the capability check engine 803 requests the router binding engine 804 to initiate access authentication processing as in normal processing. However, if the mobile access gateway does not support multihoming, the capability check engine 803 requests the router binding engine 804 to prepare the connection message 40 for notifying an entity in the local mobility domain of the connection to be made, for example.

In addition, in the embodiment of the present invention, the router binding engine 804 is employed for the purpose of notifying an entity in the local mobility domain to ensure maintenance of the multihoming function by the mobile node in the local mobility domain. The router binding engine 804 implements a function of a capability information notification unit for notifying an entity in the local mobility domain of capability information of the local mobility anchor to which the mobile node is connected, as information for surely maintaining the multihoming function. Further, in addition to this notification, the router binding engine 804 also functions as an acknowledgment requesting unit for generating and transmitting an acknowledgment message for requesting for a processing result.

In the embodiment of the present invention, information for maintaining the multihoming function is notified by the connection message 40. This notification allows an entity in the local mobility domain to know that the mobile node is about to connect to a mobile access gateway that does not support a multihoming function, and know all active connections of the mobile node through the mobile access gateways in the local mobility domain.

In addition, the router binding engine 804 also has a function of generating and transmitting various messages for notifying an entity in the local mobility domain (a message to request for reconstruction of routing information on a connection of the mobile node, a message for notification of information to reconstruct a multi-homed state of the mobile node, a message to request for recovery of a routing entry of the mobile node when it is determined that the routing entry has been deleted, and the like).

Note that although in this specification, the drawings and descriptions are given so that the present invention is presented as the most practical and preferable example, it is obvious to those skilled in the art that various modifications may be made without departing from the scope of the present invention. For example, a mobile router may implement the functional architecture shown in FIG. 8. With this, the mobile router is allowed to maintain a multihoming service related to nodes in a local mobility domain while the mobile router is positioned in the local mobility domain.

Moreover, it is obvious to those skilled in the art that the present invention is also applicable to a case where a mobile node attempts to use multihoming in a local mobility domain when the mobile node is first connected to a mobile access gateway that does not support multihoming, and then another interface of the mobile station detects a mobile access gateway that supports multihoming. Similarly in this case, the same problem occurs since a registration message from the mobile access gateway that supports multihoming deletes a routing entry of the mobile access gateway that does not support multihoming. At this time, the mobile node may use the method according to the present invention for notifying the local mobility anchor that the mobile node desires support of multihoming in the local mobility domain.

Furthermore, it is obvious to those skilled in the art that the method according to the present invention is also useful for a mobile node that implements different types of mobility protocols in the respective interfaces. An example is a case where an interface (IF 1) is associated with a mobile IPv6 protocol as described in Non-Patent Document 1, and another interface (IF 2) is associated with an extended mobile IPv6 protocol as described in Non-Patent Document 4. In this case, a registration message from the IF 1 may possibly delete a registration entry from the IF 2 existing in the same home agent. Here, the mobile node may make a query for the capability of each interface (the capability of a mobile access gateway to which each interface is connected) before providing detailed information for maintaining multihoming of the mobile node to the home agent. Note that, in an environment where an IPv4 address (mobile IPv4 protocol and proxy mobile IPv4 protocol) exists, or where a technique of prefix registration (in which the registration target is a network prefix) exists, the method of the present invention may need an adjustment to cancel out the difference among addressing systems in the respective nodes. In other words, even in such an environment, it is obvious that the method of the present invention is useful by changing implementations such as a bit length of address (prefix) information to be registered and association with a corresponding address.

In addition, in this specification, although some description is given on the assumption that the mobile node has multiple network interfaces, it suffices that there are multiple logical interfaces for implementing the present invention. For example, a system may be configured so that a wireless unit is shared by multiple connection schemes, enabling a network unit to operate as if it is connected to a network through multiple interfaces. This can be achieved by switching among the connection schemes at such a speed that the network interfaces can function without any problem even while being switched, or by maintaining a logical link in Layer 2.

Although the description of the present invention has been given in accordance with the simple network configuration shown in the drawings, various configurations are conceivable for the local network domain, including roaming relationships among multiple operators. For example, conceivable configurations include: that in which a mobile access gateway is a direct access router of a mobile node; and that in which a mobile access gateway is a boundary router between different access networks (including roaming), and after connecting to the different access network, a mobile node connects to the mobile access gateway being the boundary router via the access network. However, although design parts such as various parameters, a procedure for a mobile node to reach a mobile access gateway, a communication procedure of a mobile node and the like differ among cases, it is clear that the operation of the present invention is equally applicable to the cases including any of the configurations or conditions.

Additionally, although a local mobility management environment is assumed in the above embodiments, it is also possible to apply the present invention to a mobile network (or a layered mobile network) configured of a mobile router (MR) (and nodes controlled thereunder).

For example, in network mobility (NEMO) which is a configuration method of a mobile network, a MR performs mobility registration of a mobile network (and a mobile node) to a home agent (HA) to provide mobility support to a mobile terminal. Here, the present invention is applicable by causing the mobile node of this specification to correspond to the MR. In this case, the local mobility anchor may be considered to correspond to the HA of the MR. Further, in a case where, according to a roaming relationship or the like, a network operator providing a network using PMIP uses a tunnel between a mobile access gateway and a local mobility anchor formed in the PMIP in a multi-layered manner, the network corresponds to a layered mobile network.

Furthermore, it is possible to apply the present invention to an overlay network environment. For example, the invention is applicable by causing a mobility support for a mobile node by a mobile access gateway to corresponding to a proxy HA (pHA). In this case, it can be considered that a home agent receiving registration information from another home agent corresponds to the local mobility anchor, the another home agent being a start point (there may be various start points such as a where a time point is regarded as a basis (relative), or a state registered to the network operator (definitive)) of movement of a mobile node or being a home agent to which the mobile node is connected.

In addition, the mobile node may be configured of multiple communication devices, such as cases of attaching an insertion-type or built-in type 3GPP communication device module or a non-3GPP communication device module to a computer such as a personal computer. The present invention has similar effects on various mobile nodes as described above.

Note that each functional block used in the above description of the embodiments of the present invention is typically implemented as an LSI (large scale integration) which is an integrated circuit. Each of the LSIs may be formed into a chip, or some or all of the LSIs may be formed into a chip. Note that although the term LSI is used herein, terms such as IC (integrated circuit), system LSI, super LSI and ultra LSI may be used depending on the degree of integration.

Moreover, the scheme for creating an integrated circuit is not limited to LSI, and may be implemented by a dedicated circuit or a general-purpose processor. After manufacturing an LSI, a programmable FPGA (field programmable gate array) or a reconfigurable processor capable of reconfiguring connections and settings in a circuit cell in the LSI may be used.

Furthermore, if a technology for creating an integrated circuit which can replace the LSI is introduced along with improvement in the semiconductor technology or from another technology derived therefrom, the functional block may be integrated by use of the technology, as a matter of course. For example, biotechnology may be applied.

INDUSTRIAL APPLICABILITY

The present invention is applicable to a communication technique in a packet-exchange type data communication network system, and is particularly applicable to a network-based mobility management technique and a technique for achieving a multihoming function of a mobile node.

The invention claimed is:

1. A mobile terminal moving in a local mobility domain in which network-based mobility management is performed and which supports multihoming, the mobile terminal comprising:

a plurality of communication interfaces which enable transmission and reception of packets through a plurality of paths and which respectively correspond to the plurality of paths; and a capability information notification unit, including a processor, configured to, in connecting at least one of the plurality of communication interfaces to one of connection nodes functioning as connection points in the local mobility domain, notify an entity in the local mobility domain of information indicating whether or not the connection node to which at least two of the plurality of communication interfaces are to be connected supports a multihoming function which includes a function of notifying the entity in the local mobility domain of information to allow the entity in the local mobility domain to perform a simultaneous binding registration to hold multiple binding entries related to the mobile terminal.

2. The mobile terminal according to claim 1, wherein in a case where the capability information notification unit recognizes that the one of connection nodes to which the at least two of the plurality of communication interfaces is about to connect does not support multihoming, the capability information notification unit notifies the entity in the local mobility domain of the information on whether or not the connection node supports the multihoming function.

3. The mobile terminal according to claim 2, wherein in a case where access authentication for connecting to the one of connection nodes to which the at least two of the plurality of communication interfaces is about to connect is not established, the capability information notification unit notifies the entity in the local mobility domain of the information on whether or not the connection node supports the multihoming function.

4. The mobile terminal according to claim 2, further comprising a capability information reception unit, including a processor, configured to receive the information on whether or not the connection node supports the multihoming function, from the one of connection nodes to which the at least two of the plurality of communication interfaces is about to connect.

5. The mobile terminal according to claim 2, further comprising a capability information reception unit, including a processor, configured to receive the information on whether or not the connection node supports the multihoming function, from the one of connection nodes to which the at least two of the plurality of communication interfaces is about to connect.

6. The mobile terminal according to claim 1, wherein, upon recognizing that the one of connection nodes to which the at least two of the plurality of communication interfaces is about to connect does not support multihoming, the capability information notification unit notifies the entity in the local mobility domain of information on connections of all communication interfaces connected to the local mobility domain.

7. The mobile terminal according to claim 2, wherein in a case where access authentication for connecting to the one of connection nodes to which the at least two of the plurality of communication interfaces is about to connect is established, the capability information notification unit notifies the entity in the local mobility domain of the information on connections of all communication interfaces connected to the local mobility domain.

8. The mobile terminal according to claim 1, further comprising an acknowledgment requesting unit, including a processor, configured to request an acknowledgment message including a processing result for the information indicating whether or not the connection node to which the at least two of the plurality of communication interfaces are connected supports the multihoming function.

9. The mobile terminal according to claim 8, further comprising a routing reconstruction requesting unit, including a processor, configured to, in a case where the acknowledgment message fails to be received, request the entity in the local mobility domain to reconstruct routing information on a connection of the mobile terminal.

10. The mobile terminal according to claim 1, further comprising a re-configuration unit, including a processor, configured to, when receiving from the entity in the local mobility domain a notification that a multi-homed state of the mobile terminal is lost, notify the entity in the local mobility domain of information for re-configuring the multi-homed state of the mobile terminal.

11. The mobile terminal according to claim 1, further comprising a recovery requesting unit, including a processor, configured to, when it is judged that a routing entry is deleted in the entity in the local mobility domain, request recovery of the routing entry that is judged to be deleted.

12. The mobile terminal according to claim 11, wherein the recovery requesting unit requests the connection node, which supports multihoming and to which the mobile terminal is connected, to retransmit a registration message for reconstructing the routing entry.

13. The mobile terminal according to claim 11, wherein the recovery requesting unit selects the connection node to be requested to retransmit the registration message from among the connection nodes to which the mobile terminal is connected.

14. The mobile terminal according to claim 1, further comprising an information collecting and storing unit configured to collect information indicating whether or not each of the connection nodes in the local mobility domain supports the multihoming function and store the information as list information.

15. The mobile terminal according to claim 1, further comprising a binding specification information notification unit, including a processor, configured to, in a case where the capability information notification unit recognizes that the one of connection nodes to which the at least two of the plurality of communication interfaces is about to connect does not support multihoming, transmit a notification which includes information indicating a binding to be replaced upon establishment of the connection about to be made to the connection node.

16. The mobile terminal according to claim 15, wherein the information indicating the binding to be replaced upon establishment of the connection about to be made to the connection node includes unique identification information identifying a communication interface related to the binding to be replaced.

17. A network node in a local mobility domain in which network-based mobility management is performed and which supports multihoming for a mobile terminal connected to the local mobility domain, the network node comprising:
a routing cache for, in a case where a communication interface of the mobile terminal connects to one of connection nodes which function as connection points in the local mobility domain, holding a correspondence between the communication interface and the connection node as routing information;
a capability information reception unit, including a processor, configured to receive, from the mobile terminal, information indicating whether or not the connection node to which at least two of a plurality of interfaces included in the mobile terminal are connected supports a multihoming function which includes a function of notifying the entity in the local mobility domain of information to allow the entity in the local mobility domain to perform a simultaneous binding registration to hold multiple binding entries related to the mobile terminal; and
a routing updating unit, including a processor, configured to update routing information for the mobile terminal in accordance with the information being received by the capability information reception unit and indicating whether or not the connection node supports the multihoming function.

18. The network node according to claim 17, further comprising:
an identification information preparing unit, including a processor, configured to, in a case where the capability information reception unit receives information that the one of connection nodes to which the at least two of the plurality of communication interfaces is about to connect does not support multihoming from the mobile terminal, prepare unique identification information identifying a correspondence between the connection node and the communication interface about to connect to the connection node; and
a routing information management unit, including a processor, configured to, when receiving from the connection node the information indicating the correspondence between the connection node and the communication interface about to connect to the connection node, add the unique identification information to the routing information indicating the correspondence between the communication interface and the connection node and store the resultant routing information into the routing cache.

19. The network node according to claim 17, further comprising a routing cache update unit, including a processor, configured to, in a case where the capability information reception unit receives from the mobile terminal information on connections of all communication interfaces connected to the local mobility domain, add routing information to the routing cache in accordance with the information on connections of all of communication interfaces connected to the local mobility domain, the routing information corresponding to all of the communication interfaces connected to the local mobility domain.

20. The network node according to claim 17, further comprising an acknowledgment transmission unit, including a processor, configured to send the mobile terminal an acknowledgment message including a processing result for information indicating whether or not the connection node to which the at least two of the plurality of communication interfaces are connected supports the multihoming function.

21. The network node according to claim 17, further comprising a routing information deletion notification unit, including a processor, configured to delete the routing information for the mobile terminal from the routing cache, and notify the mobile terminal that a multi-homed state of the mobile terminal is lost.

22. The network node according to claim 17, further comprising a routing information deletion unit, including a processor, configured to, in a case of deleting the routing information for the mobile terminal, invalidate a routing according to the routing information to be deleted while suspending deletion thereof for a certain time period, validate the routing information to be deleted in a case of receiving a recovery request for the routing information to be deleted from the mobile terminal within the certain time period, and completely delete the routing information to be deleted after lapse of the certain time period in a case of receiving no recovery request for the routing information to be deleted from the mobile terminal within the certain time period.

23. The network node according to claim 17, wherein in a case where the capability information reception unit receives from the mobile terminal information indicating a binding to be replaced upon establishment of connection about to be made between the connection node and the at least two of the plurality of communication interfaces, the routing update unit replaces a binding specified by the information indicating the binding to be replaced with a binding related to the connection node about to be connected.

* * * * *